US011880502B2

(12) United States Patent
Akiyama

(10) Patent No.: US 11,880,502 B2
(45) Date of Patent: Jan. 23, 2024

(54) INFORMATION PROCESSING DEVICE, INFORMATION PROCESSING METHOD, AND NON-TRANSITORY COMPUTER READABLE STORAGE MEDIUM STORING AN INFORMATION PROCESSING PROGRAM

(71) Applicant: AHEAD BIOCOMPUTING, CO. LTD., Kanagawa (JP)

(72) Inventor: Yutaka Akiyama, Tokyo (JP)

(73) Assignee: Ahead Biocomputing, Co. Ltd., Kanagawa (JP)

( * ) Notice: Subject to any disclaimer, the term of this patent is extended or adjusted under 35 U.S.C. 154(b) by 120 days.

(21) Appl. No.: 17/486,452

(22) Filed: Sep. 27, 2021

(65) Prior Publication Data
US 2022/0011857 A1    Jan. 13, 2022

Related U.S. Application Data

(63) Continuation of application No. PCT/JP2020/014271, filed on Mar. 27, 2020.

(30) Foreign Application Priority Data

Mar. 31, 2019    (JP) .................................. 2019-069568

(51) Int. Cl.
*G06F 3/01*    (2006.01)
*G06T 19/00*    (2011.01)

(52) U.S. Cl.
CPC .............. *G06F 3/012* (2013.01); *G06T 19/00* (2013.01)

(58) Field of Classification Search
CPC ........ G06F 3/012; G06F 3/011; G06F 3/0304; G06F 3/0308; G06F 3/147; G06F 3/01;
(Continued)

(56) References Cited

U.S. PATENT DOCUMENTS 10,701,316 B1 *    6/2020  Cheung ................. H04N 7/157
2018/0181367 A1 *    6/2018  Goi ......................... G06F 1/163
(Continued)

FOREIGN PATENT DOCUMENTS

| JP | 2004-150900 A |   | 5/2004 |              |
|----|---------------|---|--------|--------------|
| JP | 2018-010486 A |   | 1/2018 |              |
| JP | 2018010486 A  | * | 1/2018 | ... A63B 69/18 |

OTHER PUBLICATIONS

Botvinick et al., "Rubber hands 'feel' touch that eyes see", Nature, 391 (6669):756, (1998).
(Continued)

*Primary Examiner* — Abderrahim Merouan
(74) *Attorney, Agent, or Firm* — POLSINELLI PC

(57) ABSTRACT

An information processing device configured to present a virtual space at a display mounted on the head of a user, the information processing device inputs detection information from a sensor that detects movement of the head of the user. The information processing device generates the virtual space including a body image representing at least a part of a body of the user in response to the detection information. The information processing device inputs correction information from a device operated to perform correction of an angle in a pitch direction of the head of the user. The information processing device corrects a pitch direction angle employed when presenting the virtual space at the display based on the correction information. The information processing device presents the virtual space at the display with the corrected pitch direction angle.

15 Claims, 18 Drawing Sheets

(58) Field of Classification Search
CPC ......... G06F 3/0481; G06T 19/00; G06T 7/73;
G02B 27/0093; G02B 27/017; G02B
2027/0138; G02B 2027/0187; A63F
13/211; A63F 13/90; A63F 13/24; A63F
13/5255; A63F 13/807; A63F 13/57;
A63F 13/212; A63F 13/25; A63F 13/525;
A63F 2300/8041; A63B 69/18; A63B
2071/0644

See application file for complete search history.

(56) References Cited

U.S. PATENT DOCUMENTS

| 2018/0302499 | A1* | 10/2018 | Kada | H04L 67/131 |
| 2018/0373414 | A1* | 12/2018 | Baba | G06F 3/0308 |
| 2019/0196689 | A1* | 6/2019 | Inomata | A63F 13/213 |
| 2019/0220087 | A1 | 7/2019 | Ishii et al. | |
| 2022/0011857 | A1* | 1/2022 | Akiyama | G06T 15/20 |

OTHER PUBLICATIONS

Slater et al., "First Person Experience of Body Transfer in Virtual Reality," PLoS ONE, 5(5):e10564, (2010).
Peck et al., "Putting yourself in the skin of a black avatar reduces implicit racial bias", Consciousness and cognition, 22(3): 779-787, (2013).
Kondo et al., "Illusory body ownership of an invisible body interpolated between virtual hands and feet via visual-motor synchronicity", Scientific reports, 8:7541, (2018).
Pavani, "Visual capture of touch: Out-of-the-body experiences with rubber gloves", Psychological Science, 11(5):353-359, (2000).
Office Action against a same family Japanese Application dated Aug. 22, 2019.

* cited by examiner

AS ENVISAGED DURING GENERATION/FILMING

AS ENVISAGED DURING GENERATION/FILMING

DURING VIEWING
(WITHOUT PITCH ANGLE CORRECTION)

DURING VIEWING
(WITH PITCH CORRECTION)

INFORMATION PROCESSING DEVICE, INFORMATION PROCESSING METHOD, AND NON-TRANSITORY COMPUTER READABLE STORAGE MEDIUM STORING AN INFORMATION PROCESSING PROGRAM

CROSS-REFERENCE TO RELATED APPLICATION

This application is a continuation application of International Application No. PCT/JP2020/014271, filed Mar. 27, 2020, the disclosure of which is incorporated herein by reference in its entirety. Further, this application claims priority from Japanese Patent Application No. 2019-069568, filed Mar. 31, 2019, the disclosure of which is incorporated herein by reference in its entirety.

FIELD

The present disclosure relates to an information processing device, an information processing method, and a non-transitory computer readable storage medium storing an information processing program.

BACKGROUND

The use of head-mounted display technology to present a virtual space has been advancing rapidly in the past few years. The ability to achieve a "sense of immersion" whereby a user has highly realistic experience has been identified as being of key importance in such technology in terms of providing user excitement and satisfaction.

Japanese Patent Application Laid-Open (JP-A) No. 2004-150900 discloses technology in which an attitude angle detector is attached to a target site on a human body in order to measure an attitude angle of the target site. An attachment angle of the attitude angle detector to the target site is saved as an initial attitude angle, and when detecting an attitude angle of the human body, computation processing is performed employing an angular velocity and angular acceleration of the attitude angle detector in addition to the initial attitude angle. An attachment angle error of the attitude angle detector with respect to the target site is thereby corrected in order to detect the attitude angle of the target site with high precision.

In this technology, actual movements of a user with a head-mounted display mounted on their head match the output attitude angle of the head-mounted display. This enables the user to appreciate images on the head-mounted display with a natural sensation, without creating a feeling of disparity between the images displayed on the head-mounted display and the sensations of the user.

It is known that displaying body parts such as hands and feet can heighten the sense of immersion. It is envisaged that future developments in this field will involve more proactive display of body parts of a central character in virtual space from a first person perspective.

In cases in which body parts of the central character are displayed from the first person perspective, if the positions of body parts of the central character as expressed on a screen differ greatly from the positions of the corresponding body parts of the user in reality, the sense of immersion may be greatly diminished.

However, JP-A No. 2004-150900 is unable to remedy this issue.

Accordingly, an object of the present disclosure is to provide an information processing device, an information processing method, and a program capable of suppressing divergence between a display position of a body part of a central character and a position of a corresponding body part of a user.

SUMMARY

An information processing device of the present disclosure is a device for presenting a virtual space at a display mounted on the head of a user. The information processing device includes: a memory; and a processor coupled to the memory, the processor being configured to: input detection information from a sensor that detects movement of the head of the user; generate the virtual space including a body image representing at least a part of a body of the user in response to the detection information; input correction information from a device operated to perform correction of an angle in a pitch direction of the head of the user; correct a pitch direction angle employed when presenting the virtual space at the display based on the correction information; and present the virtual space at the display with the corrected pitch direction angle. Such a configuration enables divergence between a display position of a body part of a central character and a position of the corresponding body part of the user to be suppressed.

The present disclosure further configured to: store the correction information in the memory, and correct the pitch direction angle in the virtual space based on the correction information stored in the memory. Such a configuration enables correction of the pitch direction angle to be performed as and whenever appropriate based on the stored correction information.

In the present disclosure, in cases in which a pitch direction correction angle is newly designated, the processor is configured to take an immediately preceding value of the correction information stored in the memory as an initial value in order to specify a correction value of the pitch direction angle in the virtual space. Such a configuration enables further correction to be easily performed.

In the present disclosure, the device includes an operation portion enabling an operation relating to a direction corresponding to a front-rear direction or an up-down direction of the user; and the processor is configured to refer to an operation amount in the direction corresponding to the front-rear direction or the up-down direction of the operation portion in order to correct the pitch direction angle employed when presenting the virtual space at the display. Such a configuration enables adjustment that is easily to instinctively understand to be performed by front-rear direction or up-down direction operation.

In the present disclosure, the device enables designation of at least one point in the virtual space; and the processor is configured to refer to a position designated using the device in order to correct the pitch direction angle employed when presenting the virtual space at the display. Such a configuration enables the pitch direction angle to be easily adjusted using a pointing device.

The present disclosure further configured to acquire a pitch direction angle of the body image in the virtual space; and the processor is configured to refer to the pitch direction angle of the body image in order to correct the pitch direction angle employed when presenting the virtual space at the display. Such a configuration enables the pitch direction angle to be automatically set.

In the present disclosure, the processor is configured to display a gauge representing a pitch direction angle correction amount in a portion of the virtual space based on the correction information. Such a configuration enables the correction amount to be precisely ascertained by referring to the gauge.

An information processing method of the present disclosure is a method for presenting a virtual space at a display mounted on the head of a user. The information processing method, in which a processor executes processing includes: inputting detection information from a sensor that detects movement of the head of the user; generating the virtual space including a body image representing at least a part of a body of the user in response to the detection information; inputting correction information from a device operated to perform correction of an angle in a pitch direction of the head of the user; correcting a pitch direction angle employed when presenting the virtual space at the display based on the correction information; and presenting the virtual space at the display with the corrected pitch direction angle. Such a method enables divergence between a display position of a body part of a central character and a position of the corresponding body part of the user to be suppressed.

A non-transitory computer readable storage medium of the present disclosure is a medium storing an information processing program executable by a processor to perform processing, the processing includes: inputting detection information from a sensor that detects movement of the head of the user; generating the virtual space including a body image representing at least a part of a body of the user in response to the detection information; inputting correction information from a device operated to perform correction of an angle in a pitch direction of the head of the user; correcting a pitch direction angle employed when presenting the virtual space at the display based on the correction information; and presenting the virtual space at the display with the corrected pitch direction angle. Such a program enables divergence between a display position of a body part of a central character and a position of the corresponding body part of the user to be suppressed.

An information processing device of the present disclosure is configured to present a virtual space at a display mounted on the head of a user. The information processing device includes: a memory; and a processor coupled to the memory, the processor being configured to: input detection information from a sensor that detects movement of the head of the user; generate the virtual space including a body image representing at least a part of a body of the user in response to the detection information; present the virtual space including the body image at the display; input correction information from a device operated to perform correction of an angle in a pitch direction of the head of the user while the virtual space including the body image is being presented at the display; and correct a pitch direction angle of the virtual space including the body image employed when presenting the virtual space at the display based on the correction information so as to suppress divergence between a display position of the body image and a position of the part of the body of the user, wherein the processor is configured to present the virtual space including the body image at the display with the pitch direction angle corrected.

An information processing method of the present disclosure is a method for presenting a virtual space at a display mounted on the head of a user. The method includes: inputting detection information from a sensor that detects movement of the head of the user; generating the virtual space including a body image representing at least a part of a body of the user in response to the detection information; presenting the virtual space including the body image at the display; inputting correction information from a device operated to perform correction of an angle in a pitch direction of the head of the user while the virtual space including the body image is being presented at the display; and correcting a pitch direction angle of the virtual space including the body image employed when presenting the virtual space at the display based on the correction information so as to suppress divergence between a display position of the body image and a position of the part of the body of the user, wherein the virtual space including the body image is presented at the display with the pitch direction angle corrected.

A non-transitory computer readable storage medium of the present disclosure is a medium storing an information processing program executable by a processor to perform processing, the processing includes: inputting detection information from a sensor that detects movement of the head of the user; generating the virtual space including a body image representing at least a part of a body of the user in response to the detection information; presenting the virtual space including the body image at the display; inputting correction information from a device operated to perform correction of an angle in a pitch direction of the head of the user while the virtual space including the body image is being presented at the display; correcting a pitch direction angle of the virtual space including the body image employed when presenting the virtual space at the display based on the correction information so as to suppress divergence between a display position of the body image and a position of the part of the body of the user; and presenting the virtual space including the body image at the display with the pitch direction angle corrected.

An information processing device of the present disclosure is configured to present a virtual space at a display mounted on the head of a user. The information processing device includes: a memory; and a processor coupled to the memory, the processor being configured to: input detection information from a sensor that detects movement of the head of the user, generate the virtual space including a body image representing at least a part of a body of the user in response to the detection information; present the virtual space including the body image at the display; and acquire correction information for correcting an angle in a pitch direction of the head of the user while presenting the virtual space including the body image at the display, and based on the correction information, correct a pitch direction angle of the virtual space including the body image employed when presenting the virtual space at the display so as to suppress divergence between a display position of the body image and a position of the part of the body of the user, wherein the processor is configured to present the virtual space including the body image at the display with the pitch direction angle corrected.

An information processing method of the present disclosure is a method for presenting a virtual space at a display mounted on the head of a user. The method includes: inputting detection information from a sensor that detects movement of the head of the user; generating the virtual space including a body image representing at least a part of a body of the user in response to the detection information; presenting the virtual space including the body image at the display; and acquiring correction information for correcting an angle in a pitch direction of the head of the user while the virtual space including the body image is presented at the display, and based on the correction information, correcting a pitch direction angle of the virtual space including the body image employed when presenting the virtual space at the display so as to suppress divergence between a display position of the body image and a position of the part of the body of the user, wherein the virtual space including the body image is presented at the display with the corrected pitch direction angle.

A non-transitory computer readable storage medium of the present disclosure is a medium storing an information processing program executable by a processor to perform processing, the processing includes: inputting detection information from a sensor that detects movement of the head of the user; generating the virtual space including a body image representing at least a part of a body of the user in response to the detection information; presenting the virtual space including the body image at the display; and acquiring correction information for correcting an angle in a pitch direction of the head of the user while presenting the virtual space including the body image at the display, and based on the correction information, correcting a pitch direction angle of the virtual space including the body image employed when presenting the virtual space at the display so as to suppress divergence between a display position of the body image and a position of the part of the body of the user, wherein the processor is configured to present the virtual space including the body image at the display with the pitch direction angle corrected.

The present disclosure enables the information processing device, the information processing method, and the program to be provided that are capable of suppressing divergence between the display position of a body part of a central character and the position of the corresponding body part of the user.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Next, explanation follows regarding an exemplary embodiment of the present disclosure.

(A) Configuration of Exemplary Embodiment of Present Disclosure

Figure 1:
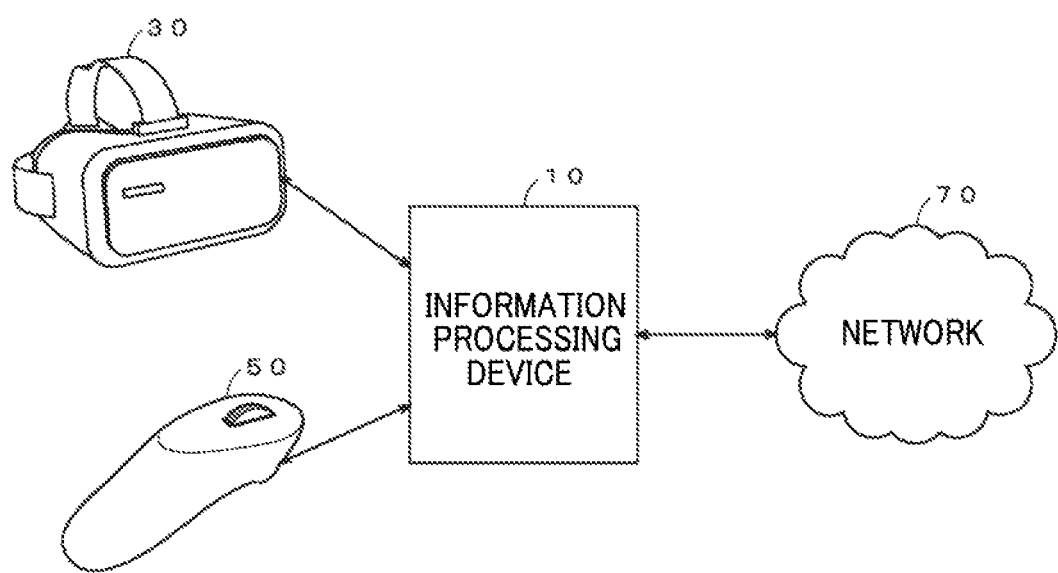
FIG. 1 illustrates an example of configuration of a system including an information processing device according to an exemplary embodiment of the present disclosure.

FIG. 1 is a diagram illustrating an example of a configuration of an information processing system including an information processing device according to an exemplary embodiment of the present disclosure. As illustrated in FIG. 1, the information processing system according to the exemplary embodiment of the present disclosure includes an information processing device 10, a head-mounted display (HMD) 30, an operation device 50, and a network 70.

Note that as described later, the information processing device 10 is configured by a personal computer or the like. For example, the information processing device 10 generates a virtual reality (VR) space image based on a program or data provided from a server (not illustrated in the drawings) connected over the network 70, provides the generated VR space image to the HMD 30, and updates the VR space image in response to movement of the head of a user to which the HMD 30 is mounted. The information processing device 10 also acquires an operation amount in cases in which the operation device 50 has been operated by the user, and executes processing (described later) in response to this operation amount. The VR space image is an example of a virtual space.

The HMD 30 is mounted on the head of the user. The HMD 30 displays the VR space image provided from the information processing device 10 on an inbuilt display, and also detects movements of the head of the user which are then provided to the information processing device 10.

The operation device 50 is operated by the user, and generates and outputs information in response to the operation amount.

The network 70 is, for example, configured by the internet, and transmits information between the non-illustrated server and the information processing device 10 in IP packets.

Figure 2:
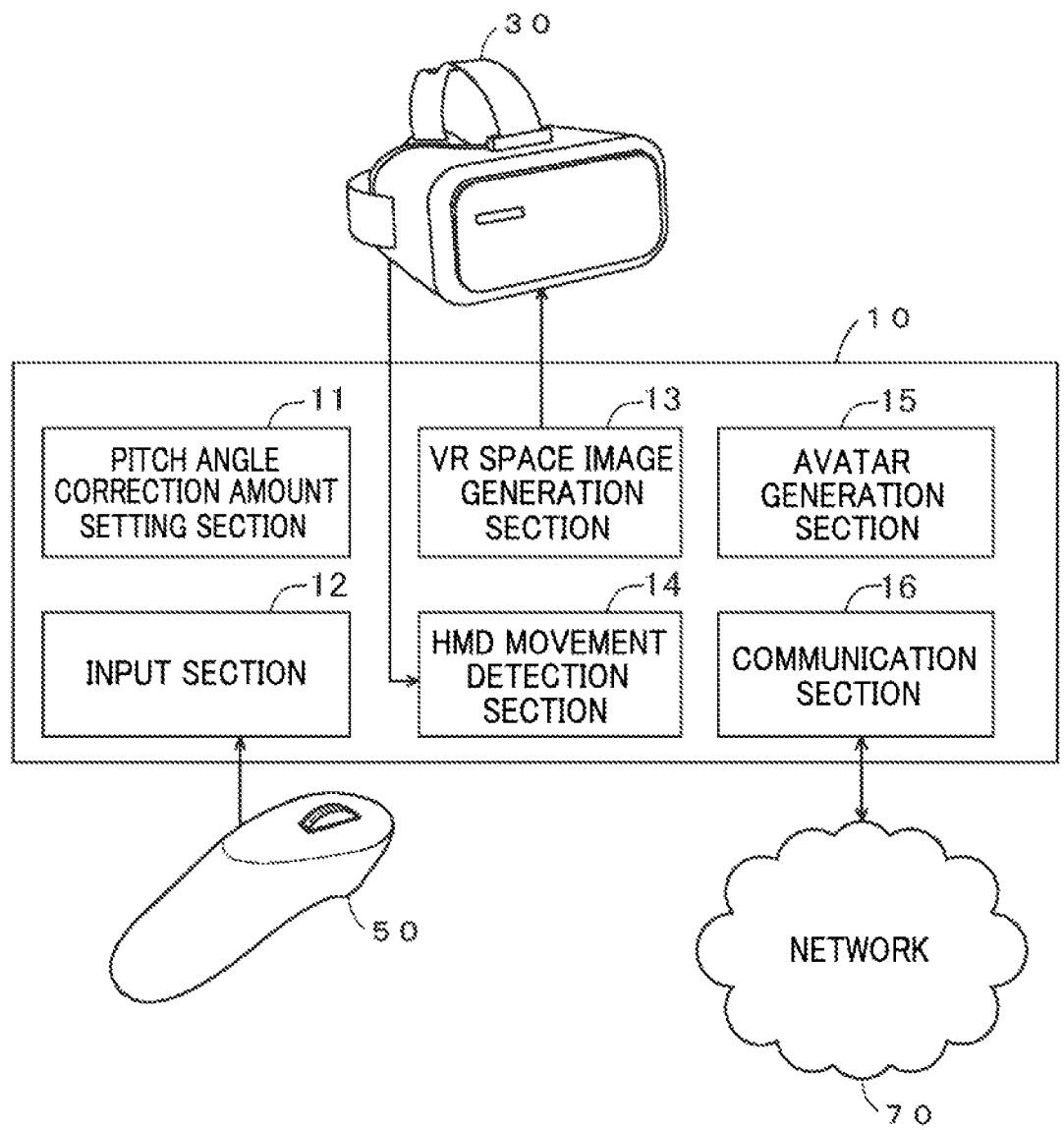
FIG. 2 is a diagram illustrating an example of configuration of the information processing device illustrated in FIG. 1.

FIG. 2 is a block diagram illustrating an example of an electrical configuration of the information processing device 10. As illustrated in FIG. 2, the information processing device 10 includes a pitch angle correction amount setting section 11, an input section 12, a VR space image generation section 13, a HMD movement detection section 14, an avatar generation section 15, and a communication section 16.

The pitch angle correction amount setting section 11 sets a correction amount for a pitch angle of the VR space image based on information input from the operation device 50.

The input section 12 inputs information indicating the operation amount from the operation device 50 when the operation device 50 is operated.

The VR space image generation section 13 generates a VR space image constructed in the surroundings of the user and provides the VR space image to the HMD 30.

The HMD movement detection section 14 inputs information relating to movement of the HMD 30 as output from acceleration sensors (described later) of the HMD 30 in order to detect the movement of the HMD 30, and thereby detects movement of the head of the user.

The avatar generation section 15 generates an image representing at least a part of a body of an avatar embodying the main character giving a first person perspective. The image of at least a part of the body of the avatar is an example of a body image.

The communication section 16 accesses the non-illustrated server through the network 70 in order to acquire information held on the server and transmit information to the server.

Figure 3:
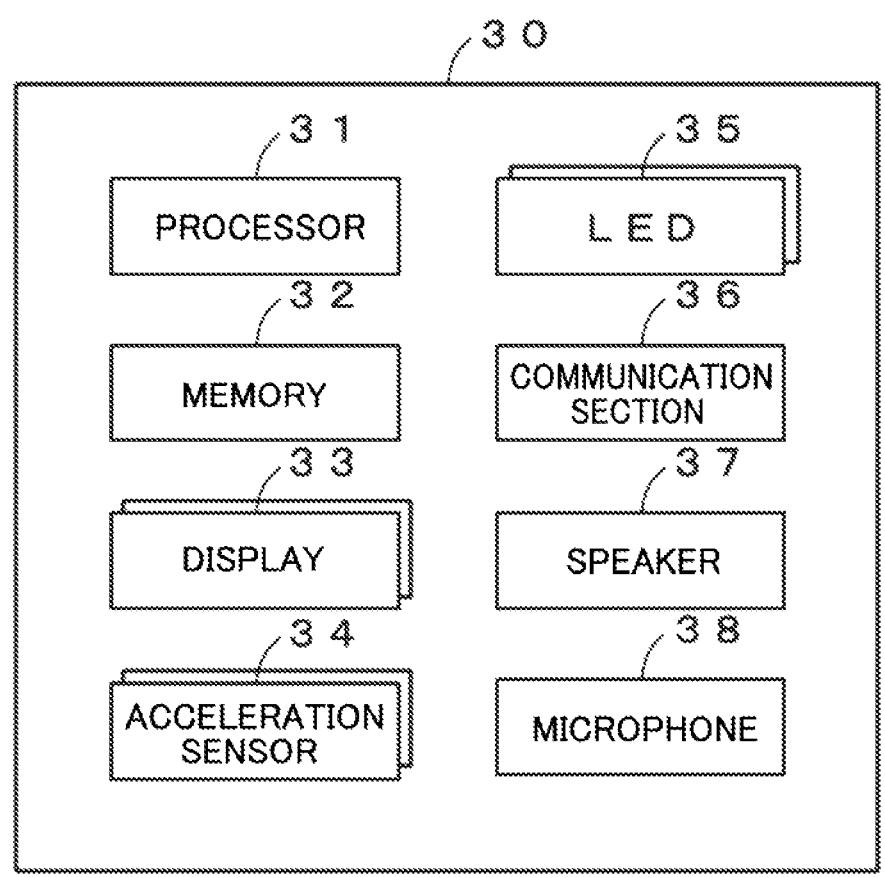
FIG. 3 is a diagram illustrating an example of configuration of a HMD illustrated in FIG. 1.

FIG. 3 is a block diagram illustrating an example of an electrical configuration of the HMD 30. As illustrated in FIG. 3, the HMD 30 includes a processor 31, memory 32, a pair of displays 33, plural acceleration sensors 34, plural light emitting diodes (LEDs) 35, a communication section 36, a speaker 37, and a microphone 38.

Note that the HMD 30 is employed mounted on the head of the user. The HMD 30 includes the pair of displays 33 provided on the left and right so as to display the VR space image provided from the information processing device 10 to the left and right eyes of the user, as well as a pair of left and right optical lenses positioned between the displays 33 and the eyes of the user so as to enlarge the viewable angle, and the acceleration sensors 34 for detecting movement of the head of the user.

The processor 31 controls various sections of the device based on a program and data held in the memory 32

The memory 32 is, for example, configured by random access memory (RAM), read only memory (ROM), and the like, and holds a program for execution by the processor 31, as well as other data.

The displays 33 present the VR space image provided from the information processing device 10 to the left and right eyes of the user.

Figure 4:
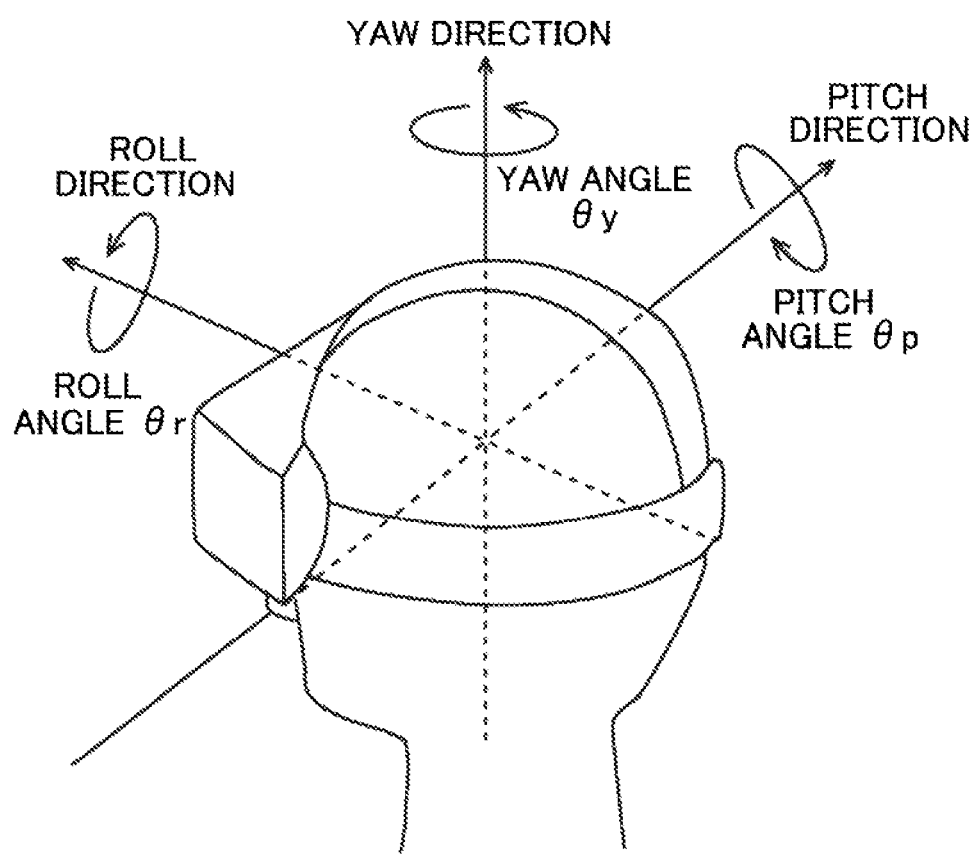
FIG. 4 is a diagram illustrating three axial directions included in the HMD illustrated in FIG. 3.

The acceleration sensors 34 are, for example, configured by gyro sensors. As illustrated in FIG. 4, the acceleration sensors 34 detect and output acceleration including a roll angle θr corresponding to an angle in a roll direction, namely a direction in which the user moves their head by tilting their neck toward the left or right, a yaw angle θy corresponding to an angle in a yaw direction, namely a direction in which the user moves their head by swinging their face toward the left or right, and a pitch angle θp corresponding to an angle in a pitch direction, namely a direction in which the user moves their head by raising or lowering their chin.

Returning to FIG. 3, the LEDs 35 are, for example, configured by light emitting markers, and are disposed so as to enable detection of the HMD 30 position by the information processing device 10.

The communication section 36 is connected to the information processing device 10 either wirelessly or through a cable. The communication section 36 receives the VR space image from the information processing device 10, and transmits information indicating acceleration of the HMD 30 in three axial directions as detected by the acceleration sensors 34 to the information processing device 10.

The speaker 37 converts and outputs audio from audio information provided from the information processing device 10 via the communication section 36. Note that headphones may be employed instead of the speaker 37.

The microphone 38 converts the voice of the user into electrical signals which are then output.

Figure 5:
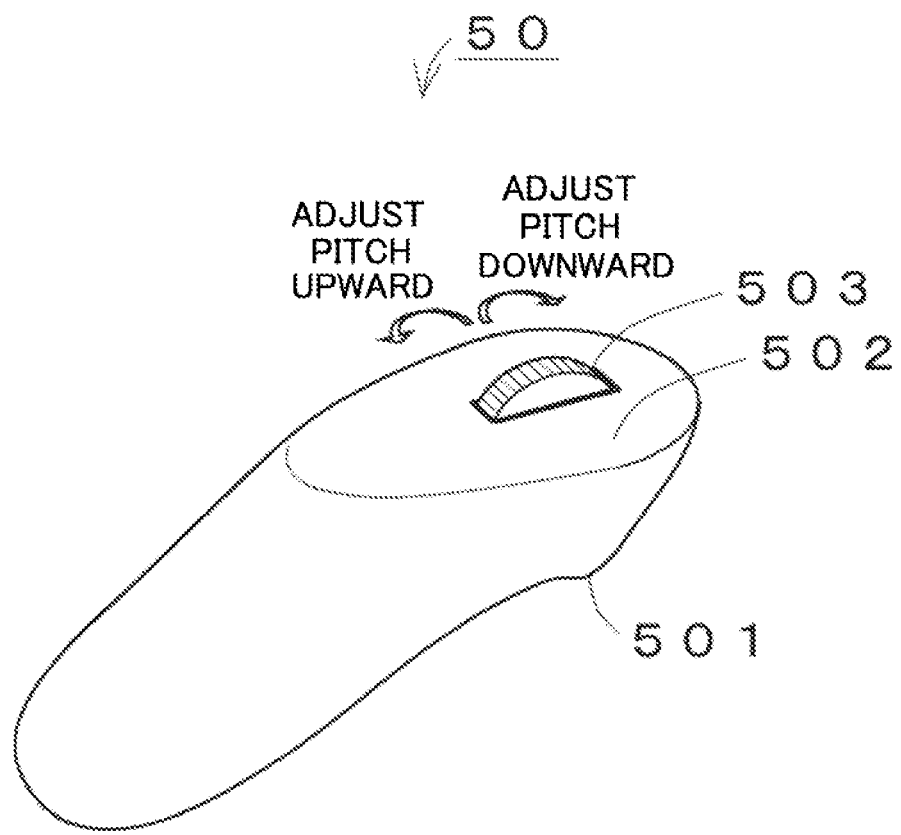
FIG. 5 is an external perspective view illustrating an operation device illustrated in FIG. 1.

FIG. 5 is an external perspective view illustrating an example of configuration of the operation device 50. As illustrated in the example of FIG. 5, the operation device 50 includes a main body 501 configured from resin. The main body 501 is gripped by the user when in use. An end portion of the main body 501 is formed with a flat face portion 502 on which an operation portion 503 is disposed. Rotating the operation portion 503 enables the user to adjust the pitch angle at which the VR space image is presented, as described later.

Figure 6:
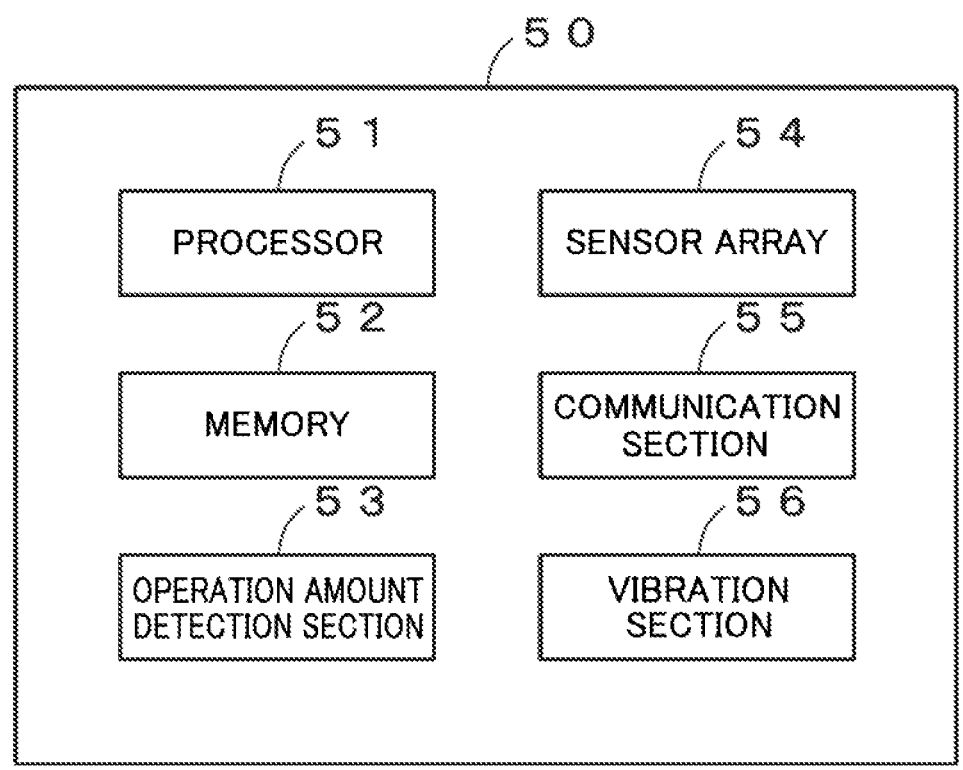
FIG. 6 is a diagram illustrating an example of an electrical configuration of the operation device illustrated in FIG. 1.

FIG. 6 illustrates an example of an electrical configuration of the operation device 50. As illustrated in FIG. 6, the operation device 50 includes a processor 51, memory 52, an operation amount detection section 53, a sensor array 54, a communication section 55, and a vibration section 56.

The processor 51 controls the respective sections of the device based on a program and data held in the memory 52.

The memory 52 is, for example, configured by RAM, ROM, and the like, and holds a program for execution by the processor 51, as well as other data.

The operation amount detection section 53 for example detects and outputs an operation amount of the operation portion 503 illustrated in FIG. 5. More specifically, in the example of FIG. 5, the operation portion 503 has a dial-type structure, and the operation amount detection section 53 is configured by a rotary encoder that detects a rotation angle of the dial-type operation portion 503, and generates and outputs information indicating an operation amount by the user.

The sensor array 54 is, for example, configured by tilt sensors or the like, and detects and outputs an angle of the operation device 50.

The communication section 55 is connected to the information processing device 10 either wirelessly or through a cable, and for example receives information for controlling the vibration section 56 from the information processing device 10, and transmits information detected by the operation amount detection section 53 and the sensor array 54 to the information processing device 10.

The vibration section 56 is, for example, configured by a vibration motor, and generates vibrations to vibrate the main body 501 of the operation device 50 under the control of the processor 51.

(B) Operation of Exemplary Embodiment of the Present Disclosure

Next, explanation follows regarding operation of the present exemplary embodiment of the disclosure. Explanation follows regarding an outline of operation of the present exemplary embodiment of the disclosure, followed by more detailed explanation of the operation with reference to flowcharts.

Figure 7:
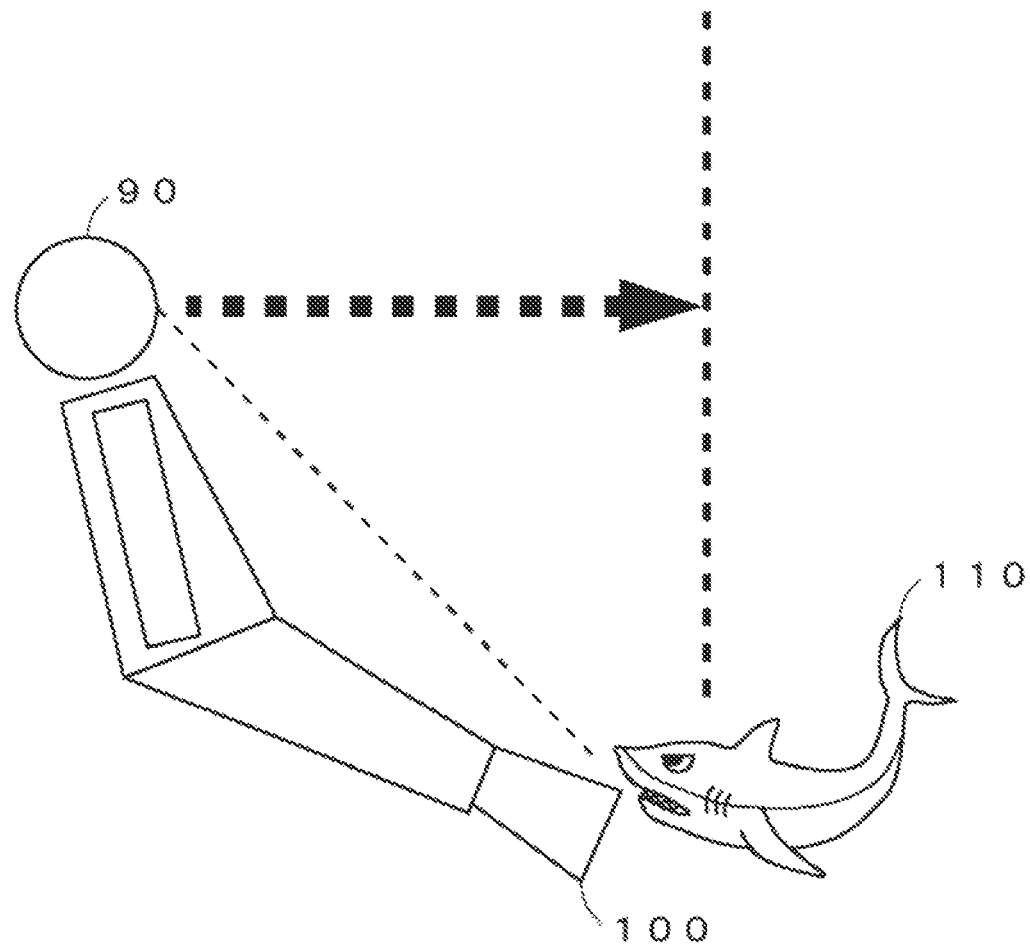
FIG. 7 is a diagram illustrating positional relationships in a VR space image as intended by a creator etc.

FIG. 7 to FIG. 12 are diagrams to explain operation of the present disclosure in outline. FIG. 7 illustrates a situation envisaged by a creator or photographer (hereafter "creator etc.") of a VR space image in a case in which an underwater environment is presented as the VR space image. In the example of FIG. 7, the underwater environment employed as the VR space image (specific details thereof are omitted for simplicity of illustration) is presented to a user 90. In the example of FIG. 7, a fin 100 configuring a body part of an avatar (simulation) of the user 90 is presented at a position corresponding to the feet of the user 90. In the example in FIG. 7, a shark 110 is attacking the fin 100. Namely, the creator etc. envisages that the user 90 will be viewing in a seated position and that the feet of the user 90 will be present at a downward angle of approximately 45° with respect to a forward-facing direction of a virtual camera when creating or filming (hereafter "creating etc.") the VR space image.

Figure 8:
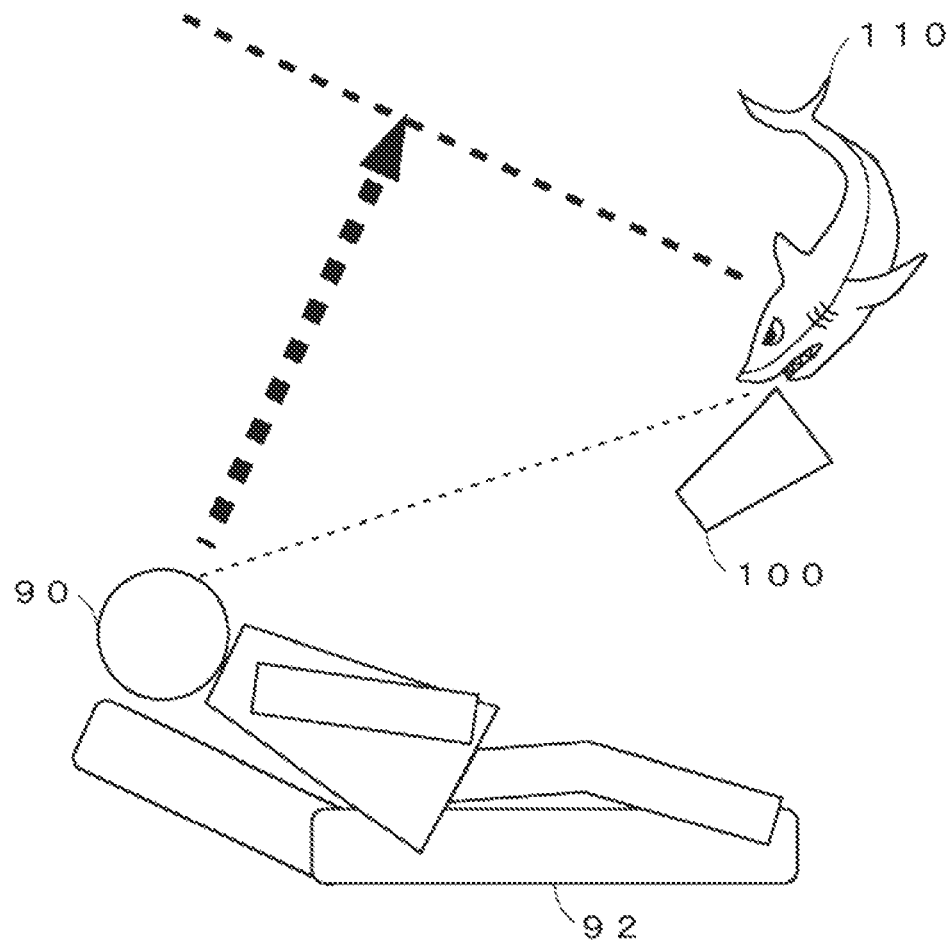
FIG. 8 is a diagram illustrating positional relationships in an actual VR space image.

FIG. 8 illustrates a situation during actual viewing by the user 90. In the example of FIG. 8, the user 90 is not in a seated position, and is for example viewing the VR space image in a reclining position while lying on a sofa 92 or the like. In such cases, since a conventional information processing device used to present VR space images does not consider the posture of the user 90, the fin 100 would be displayed at a position away from the feet of the user 90 as illustrated in FIG. 8. In such cases, the user 90 would struggle to recognize the fin 100 as part of their own body, so even were the fin 100 to be attacked by the shark 110, the user 90 would struggle to experience this as an attack against their own body.

Hitherto, when introducing interactions in which other characters such as enemies, monsters, or friends approach or contact the body of the central character from a first person perspective in VR space, there has been an issue whereby a sense of immersion is greatly diminished if the position of a body part of the central character present in the VR space image is different to the corresponding position of the user 90 in real life.

Figure 9:
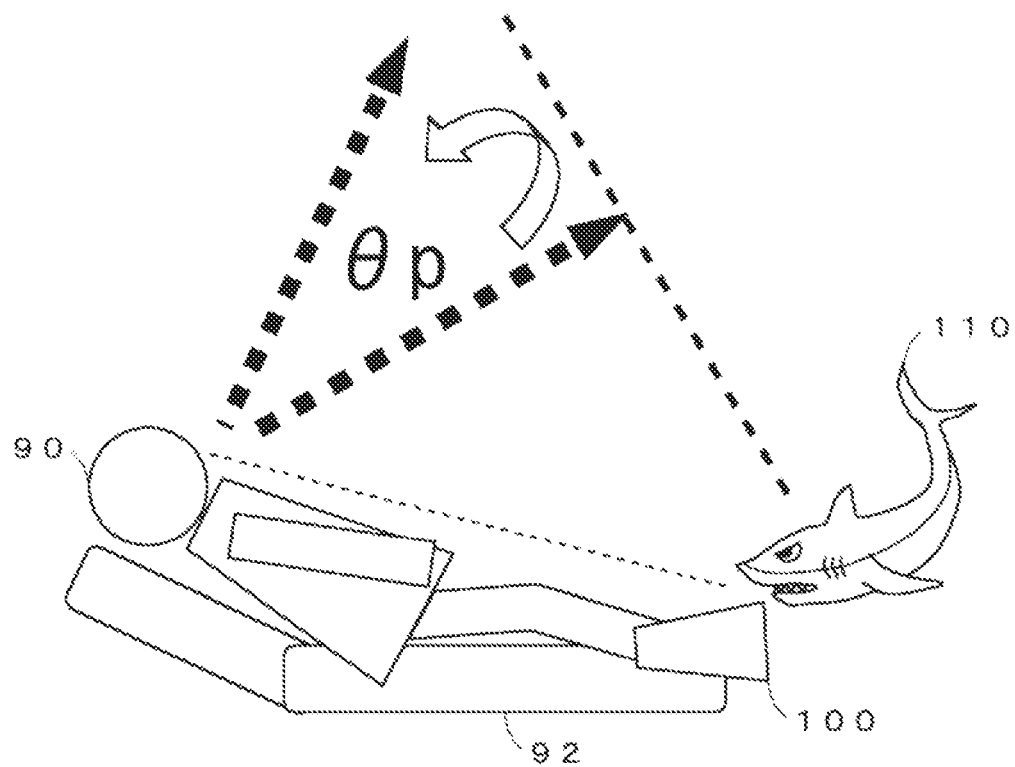
FIG. 9 is a diagram illustrating positional relationships in a VR space image following pitch angle correction.

Accordingly, in the present exemplary embodiment of the disclosure, the user 90 operates the operation portion 503 of the operation device 50 at the start of playback of the VR space image or during playback of the VR space image to correct the pitch angle θp as illustrated in FIG. 9 in order to make adjustments such that the image of the body part of the avatar of the user 90 and another character interacting with such a body part are presented at positions envisaged by the creator etc.

Figure 10:
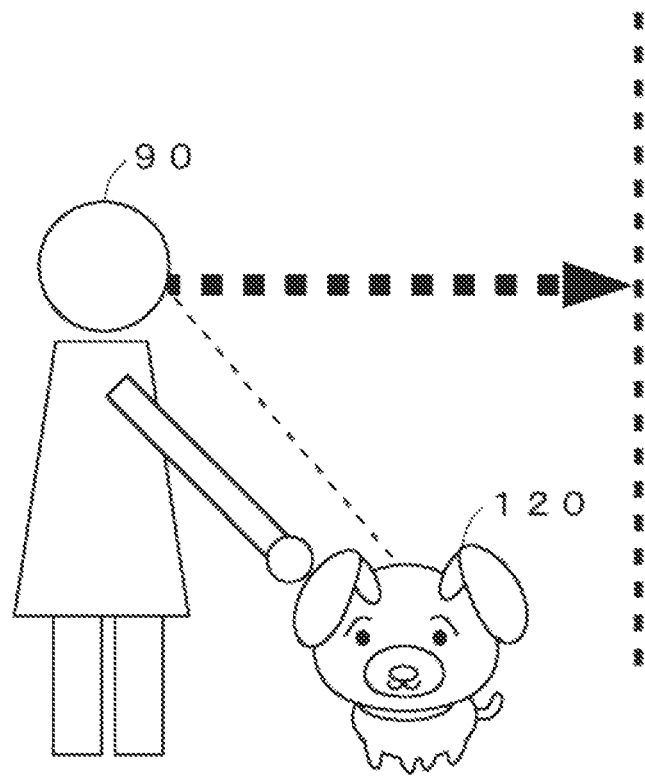
FIG. 10 is a diagram illustrating positional relationships in a VR space image as intended by a creator etc.
Figure 11:
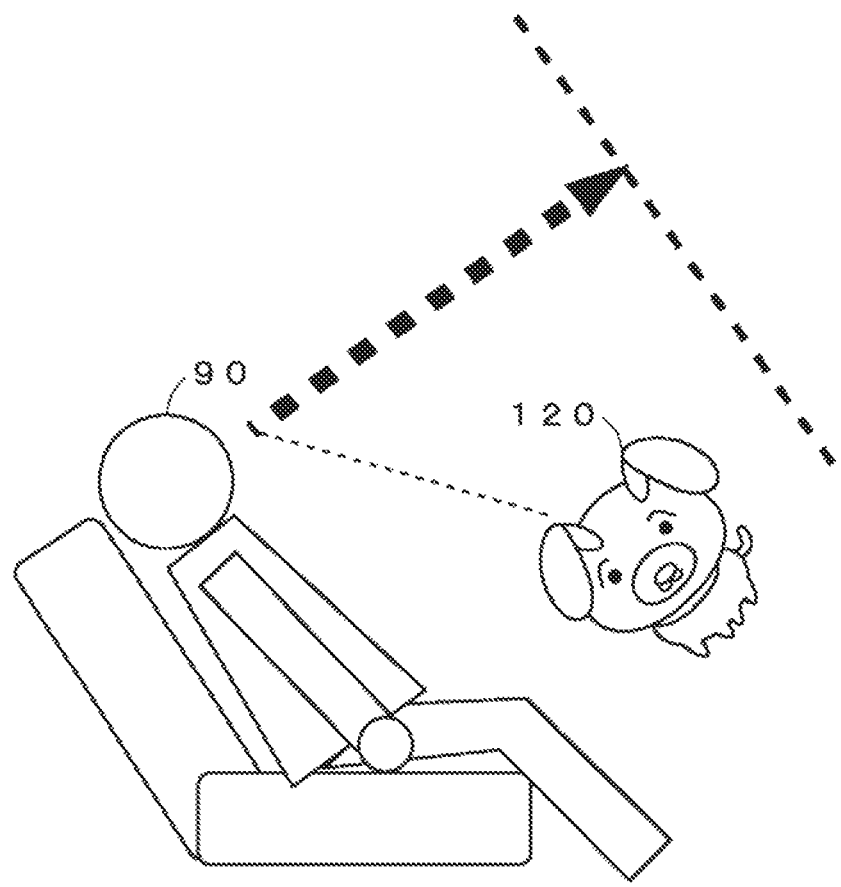
FIG. 11 is a diagram illustrating positional relationships in an actual VR space image.
Figure 12:
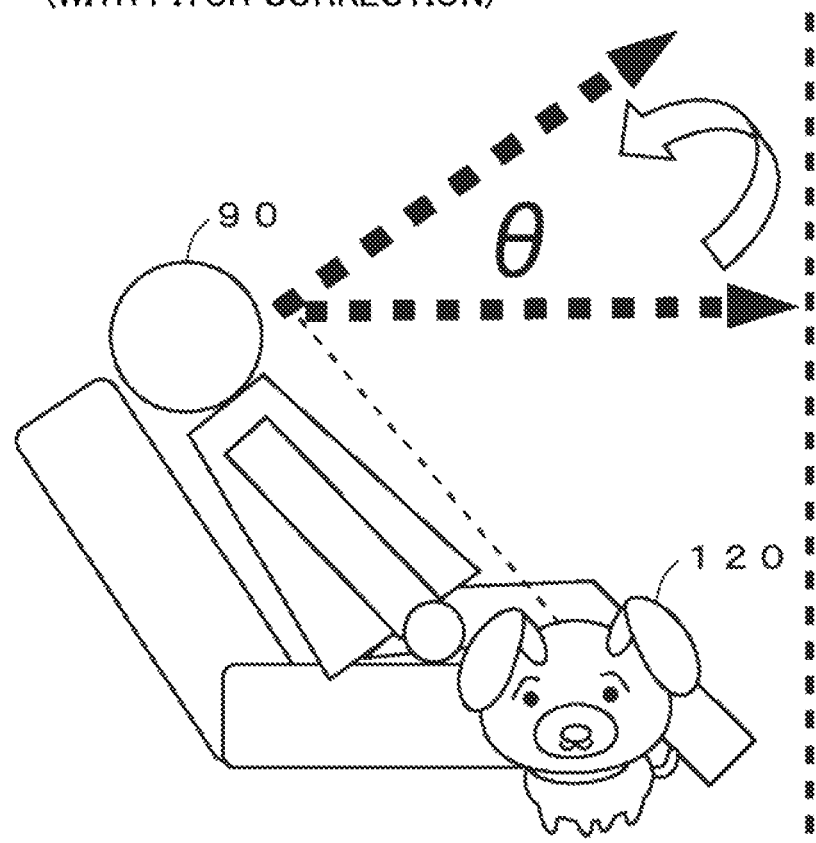
FIG. 12 is a diagram illustrating positional relationships in a VR space image following pitch angle correction.

FIG. 10 to FIG. 12 illustrate other examples of content. FIG. 10 illustrates a relationship between a VR space image and the user 90 as intended by the creator etc. Namely, the example of FIG. 10 illustrates a state in which the user 90 is standing, and a dog 120 is present by the feet of the user 90.

FIG. 11 illustrates a state during actual viewing. In the example of FIG. 11, the user 90 is in a seated position with their upper body leant back with respect to a vertical direction. In such cases, the dog 120 would be displayed in a state floating in the air instead of by the feet of the user 90. Were a hand configuring part of the avatar of the user 90 to be displayed at a corresponding position in the VR space image, the user 90 would struggle to recognize the hand as their own hand when stroking the dog 120 using the hand of the avatar.

FIG. 12 illustrates an example of display in a case in which the display position has been adjusted in the present exemplary embodiment. In the present exemplary embodiment, the user 90 can operate the operation portion 503 of the operation device 50 at the start of playback of the VR space image or during playback of the VR space image to adjust the pitch angle θp as illustrated in FIG. 12 in order to make a correction such that the VR space image is presented at the position envisaged by the creator etc. This enables the dog 120 to be displayed beside the feet of the user 90. In this case, when the hand configuring part of the avatar of the user 90 is displayed and the user 90 strokes the dog 120 using the hand of the avatar, the user 90 is able to recognize the hand as being their own hand.

In this manner, making an adjustment such that the part of the body of the avatar and the corresponding part of the body of the user 90 align heightens a sense of body ownership of the avatar, and thus enables a heightened sense of immersion to be achieved.

Note that a sense of body ownership is discussed in the following theses.

For example, thesis 1 ("Rubber hands 'feel' touch that eyes see", by M. Botvinick and J. Cohen, Nature volume 391 (6669): 756 (1998)) describes the "rubber hand illusion" (RHI), in which a rubber prosthetic hand is placed in a field of vision presented to a subject and a preparatory exercise is performed in which the actual hand of the subject, this being at a location hidden from the field of vision, and the rubber prosthetic hand are touched at the same time as each other. The brain of the subject subsequently creates an illusory sensation of contact in response to purely visual information of the rubber prosthetic hand being touched. Note that this and a range of related phenomena are referred to as body transfer and sense of body ownership, and have been the focus of intense research in recent years.

Thesis 2 ("First Person Experience of Body Transfer in Virtual Reality", by M. Slater. B. Spanlang, M. V. Sanchez-Vives, and O. Blanke, PLS ONE 5(5): e10564 (2010)) describes how a sense of body ownership is obtained not only in a first person perspective but also in a third person perspective.

Thesis 3 ("Putting yourself in the skin of a black avatar reduces implicit racial bias" by T. C. Peck, S. Seinfeld, S. M. Aglioti, and M. Slater, Consciousness and Cognition 22(3): 779-787, (2013)) describes now a sense of body ownership is obtained regardless of differences in skin color and the like of the avatar being displayed.

Thesis 4 ("Illusory body ownership of an invisible body interpolated between virtual hands and feet via visual-motor synchronicity", by R. Kondo, M. Sugimoto, K. Minatnizawa, T. Hoshi, M. Inami, and M. Kitazaki, Scientific Reports 8: 7541 (2018)) discusses a phenomenon in which a sense of body ownership is obtained for an invisible area even in cases in which only hands and feet are displayed so as to be synchronized with movements of a subject and the body that should be present between the hands and feet is not displayed, as if the person were invisible.

Thesis 5 ("Visual capture of touch: out-of-the-body experiences with rubber gloves" by F. Pavani, Psychological Science, 11(5): 353-359, (2000)) describes how a smaller difference between the angle of a placed prosthetic hand and an angle at which a hand should appear in real life enhances a sense of body ownership. Namely, due to natural characteristics of human cognition, when a body of a central character displayed in a virtual space is as close as possible to the position of body of a user in real space, bodily sensations are more readily transferred, hinting at a tendency for a sense of immersion to be more readily obtained as a result.

Namely, the present exemplary embodiment builds on such scientific characteristics that are included in natural cognitive mechanisms of the human brain while focusing on various characteristics that are commonly shared by virtual reality content in order to provide a technical solution to for example the situation illustrated in FIG. 8.

Moreover, out of the three angles (θr, θy, θp) detected from head movement of the user 90 and employed in gaze adjustment, the present exemplary embodiment pays particularly close attention to the pitch angle θp. Namely, although the posture of an avatar configuring a central character from a first person perspective may change in various ways with the progression of a story, when a person's eyes see their own body within the field of vision, tilting of the neck (movement in a roll-axis direction) and looking around toward the left and right (movement in a yaw-axis direction) are relatively uncommon. In most cases, there will be no issue with assuming that a central character will look substantially straight ahead without tilting their neck or shifting toward the left or right from a subject of interest.

When one's own body appears in a field of vision, it will be close to the center straight ahead in the field of vision in most cases, and so may be expected to appear within the width of one's own shoulders in most cases. In such situations, the appearance changes greatly with upward and downward movement of the chin (movement in the pitch-axis direction). Although the shape of a person's own body in their field of vision changes in response to various actions such as standing up, sitting down, crouching, lying down, and the like, in the main, such changes can be approximated by adjustments to the pitch angle.

Accordingly, in the present disclosure, in addition to the HMD movement detection section 14 that detects movement of the gaze based on the roll angle θr, the yaw angle θy, and the pitch angle θp using sensors that pick up movement of the head of the user, the pitch angle correction amount setting section 11 is also provided to enable forced movement (pitching upward, pitching downward) based on the intention of the user 90 of the pitch angle that defines changes to the gaze in an up-down direction in particular. This enables a disconnect between the expression of the body of an avatar configuring the central character from a first person perspective and the posture of the user in real life to be reduced.

Since the human brain is highly capable of making adjustments, simply making a rough adjustment to align the positions of the four limbs may be expected to produce a strong psychological effect sufficient to maintain a sense of immersion. Accordingly, in the present exemplary embodiment, the operation device 50 is used to carry out rough positional alignment between the body of the avatar of the central character from a first person perspective and the posture of the body of the user 90 in real life. A virtual space with a heightened sense of immersion can be provided by the user 90 operating the operation device 50 in line with their intentions.

Figure 13:
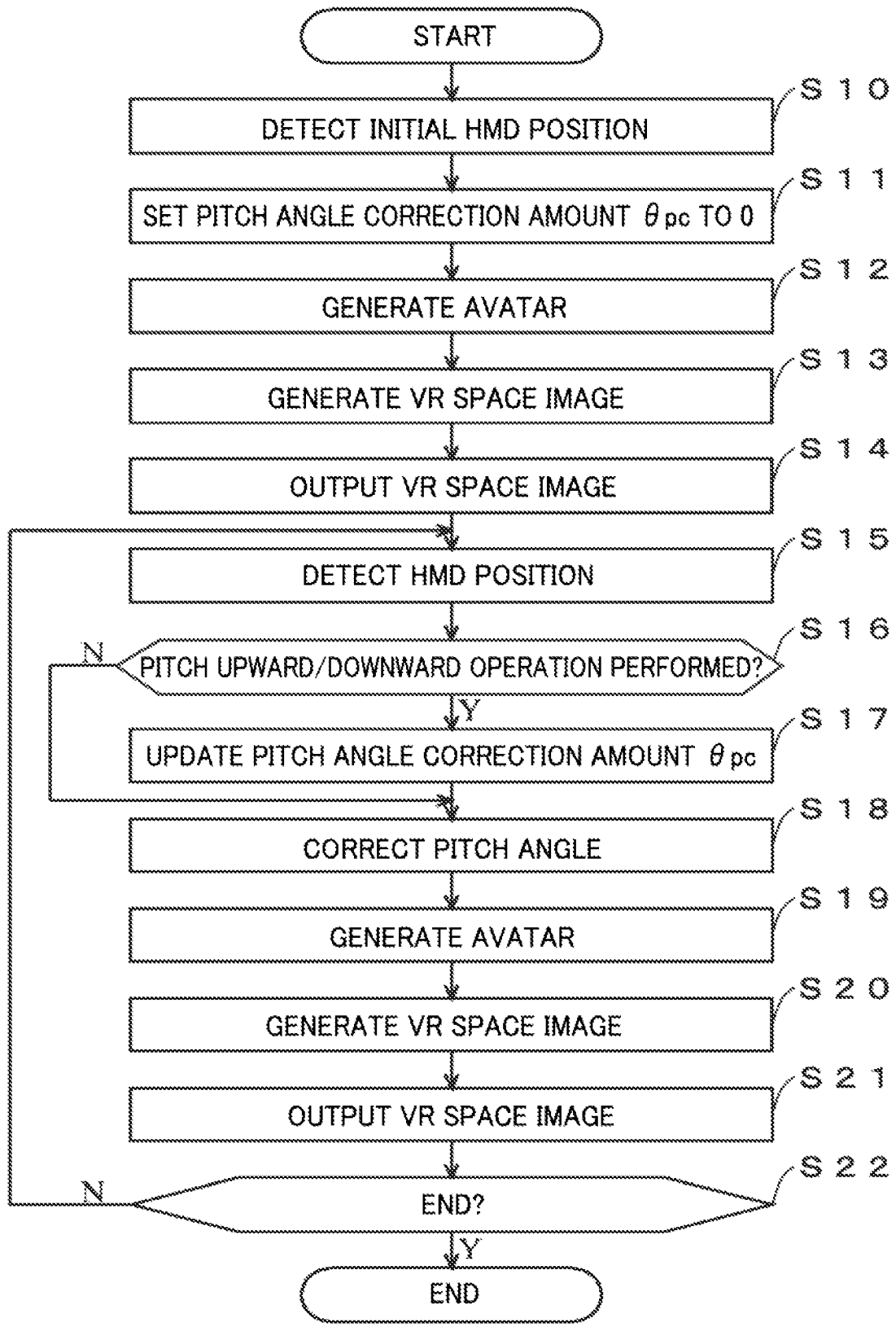
FIG. 13 is flowchart to explain an example of processing executed in the exemplary embodiment illustrated in FIG. 2.

FIG. 13 is a flowchart to explain an example of processing executed in the present exemplary embodiment of the disclosure. Explanation follows regarding detailed operation of the present disclosure, with reference to the flowchart illustrated in FIG. 13. The following steps are executed when the processing of the flowchart illustrated in FIG. 13 is started.

At step S10, the HMD movement detection section 14 of the information processing device 10 refers to the output of the acceleration sensors 34 of the HMD 30 in order to detect an initial position of the HMD 30. Namely, for example, an initial roll angle θr0, an initial yaw angle θy0, and an initial pitch angle θp0 are detected as the initial position of the HMD 30 in three axial directions. For example, in cases in which θr0=0, θy0=0, and θp0=0, the roll angle θr, the yaw angle θy, and the pitch angle θp used as a graphic rendering reference are respectively set to θr=0, θy=0, and θp=0. Note that instead of using the output of the acceleration sensors 34, an initial position may alternatively be detected by image recognition in which the LEDs 35 provided to the HMD 30 are illuminated and used as markers.

At step S11, the pitch angle correction amount setting section 11 substitutes "0" for an initial value of a pitch angle correction amount θpc.

At step S12, the avatar generation section 15 executes processing to generate an avatar image of the user 90 based on the roll angle θr, the yaw angle θy, and the pitch angle θp as the initial position detected at step S10. For example, for the example illustrated in FIG. 7, the avatar generation section 15 generates an image of the fin 100 attached to part of the body of the avatar of the user 90.

At step S13, the VR space image generation section 13 executes processing to generate a VR space image based on the roll angle θr, the yaw angle θy, and the pitch angle θp as the initial position detected at step S10. For example, for the example illustrated in FIG. 7, an image expressing an underwater environment is generated, and the avatar image generated at step S12 is superimposed thereon in order to generate the VR space image.

At step S14, the VR space image generation section 13 outputs the VR space image generated at step S13 to the HMD 30. As a result, for example the communication section 36 of the HMD 30 receives and provides the VR space image to the processor 31. The processor 31 then displays the VR space image provided by the communication section 36 on the displays 33.

At step S15, the HMD movement detection section 14 refers to information provided from the acceleration sensors 34 of the HMD 30 in order to detect a position of the HMD 30. More specifically, the HMD movement detection section 14 detects movement in the roll-axis direction, the yaw-axis direction, and the pitch-axis direction illustrated in FIG. 4.

At step S16, the pitch angle correction amount setting section 11 refers to information input from the input section 12 to determine whether or not the operation portion 503 of the operation device 50 has been operated to move the pitch upward or downward. Processing proceeds to step S17 in cases in which operation is determined to have been performed (step S16: YES), and processing proceeds to step S18 in all other cases (step S16: NO). For example, in cases in which the operation portion 503 has been rotated by the thumb of the user or the like, a determination of YES is made, and processing proceeds to step S17.

At step S17, the pitch angle correction amount setting section 11 executes processing to update the pitch angle correction amount θpc in response to the operation amount of the operation portion 503 of the operation device 50 as detected at step S16. For example, in the example of FIG. 9. "−35°" is input in response to the operation amount of the operation portion 503, and so the pitch angle correction amount θpc is set to −35. When converting the operation amount of the operation portion 503 to the pitch angle correction amount θpc, the sensitivity is preferably adjustable through a system option screen or the like.

At step S18, the VR space image generation section 13 executes processing to correct the pitch angle according to the pitch angle correction amount that was updated at step S17. For example, in the example of FIG. 9 described above, since the pitch angle correction amount θpc is −35, the VR space image generation section 13 executes processing to correct the pitch angle θp by −35° (processing to set θp to θp÷θpc).

At step S19, the avatar generation section 15 executes processing to generate an avatar image of the user 90 based on the pitch angle that was corrected at step S18. For example, in the example of FIG. 9 described above, the avatar generation section 15 generates an image of the fin 100 attached to a body part of the avatar of the user 90 based on the pitch angle θp that was corrected at step S18.

At step S20, the VR space image generation section 13 executes processing to generate a VR space image. For example, in the example of FIG. 9 described above, an image expressing an underwater environment as well as an image of the shark 110 is generated based on the pitch angle θp that was corrected at step S18. The VR space image is then generated by superimposing the avatar image generated at step S12 on these images.

At step S21, the VR space image generation section 13 outputs the VR space image generated at step S20 to the HMD 30. As a result, for example the communication section 36 of the HMD 30 receives the VR space image and provides the VR space image to the processor 31. The processor 31 displays the VR space image provided by the communication section 36 on the displays 33. As a result, as illustrated in FIG. 9, the VR space image is displayed on the displays 33 of the HMD 30 with the fin 100 configuring the avatar image and the shark 110 adjusted to appropriate positions. As described above, it is known that the human brain undergoes bodily sensory transfer between the self and the central character in the VR space to create a sense of body ownership. When this occurs, sensations are attained more readily the closer the position of the visual expression of the body of the central character provided in the virtual space to where it should be with respect to the physical body. Accordingly, for example in the example of FIG. 9, the sense of body ownership with respect to the fin 100 can be heightened by correcting the pitch angle θp. This enables the attack by the shark 110 to be strongly recognized as an attack against one's own body, thereby enabling the sense of immersion in the VR space to be heightened.

At step S22, the VR space image generation section 13 determines whether or not to end the processing. The processing is ended in cases in which determination is made to end the processing (step S22: YES), whereas the processing returns to step S15 and similar processing to that described above is repeated in all other cases (step S22: NO).

Through the above processing, as illustrated in FIG. 8 as an example, in cases in which the position of the fin 100 configuring a part of the avatar image and the position of the feet of the user 90 are not aligned, the pitch angle θp is corrected by operating the operation portion 503 of the operation device 50 so as to align the respective positions as illustrated in FIG. 9, enabling a heightened sense of immersion in the VR space.

Specifically, the information processing device 10 corrects the angle of the VR space image including the avatar in the pitch direction so as to suppress divergence between the display position of the body part of the central character and the position of the corresponding body part of the user 90. The information processing device 10 then presents the VR space image with the corrected pitch direction angle on the display. Suppressing divergence between the display position of the body part of the central character and the position of the corresponding body part of the user 90 heightens the sense of immersion experienced by the user 90. The processing of the information processing device 10 thus exhibits the technological advantageous effect of assisting in heightening the sense of immersion experienced by the user 90. More specifically, the configuration of the information processing device 10 enables the user 90 to obtain a sense of immersion similar to those discussed in Documents 1 to 5 described previously.

Conventional VR technology has primarily sought to correct VR space images in response to movement of a HMD mounted on the head of a user. Note that mechanisms to implement degrees of freedom (DoF) in VR space include both mechanisms implementing three degrees of freedom (mechanisms that only reflect changes in the pitch angle, yaw angle, and roll angle of the head of the user in VR space images), and mechanisms implementing six degrees of freedom (mechanisms that further reflect changes in parallel movement of the head of the user in VR space images).

In either mechanism type, the primary aim is to detect movement of the "head" of the user and reflect this movement in VR space images. Early VR technology was not concerned with movements of parts of the body of the user other than the head. This reflects that fact that in the early days of VR technology, applications were envisaged in which a user watches, listens, and operates while in a standard posture, for example sitting in a seat, for example when piloting an aircraft or driving a road vehicle. In such cases, there is little room for a disconnect between the actual physical posture of a user and a posture of the user envisaged by the VR content creator.

By contrast, future VR technology will demand compatibility with various types of posture, including cases in which a user is lying horizontally or a user is in a relaxed posture.

Conventional VR technology also includes technology in which movements of the four limbs and so on of the user are reflected in a VR space image. For example, a user may grip an operation device in one or both hands, with the position or movement of this operation device being detected using sensor arrays, external cameras, or the like to enable the state of the four limbs of the user to be reflected in a VR space image.

In such cases, for example the operation device may resemble a sporting implement such as a tennis racket or a weapon used for fighting, with mechanisms for dynamically generating images of the body of the user and other equipment according to information detected by sensors or the like being provided to produce a natural-looking display in a VR space image.

However, in such cases, it is assumed that the posture of the user envisaged by the VR content creator and the actual physical posture of the user will substantially match each other, and the object is merely to reflect the positions of the arms or the like of the user in the VR space image.

As a natural continuation of such technology, it becomes necessary to produce sensor arrays applicable to all body positions, for example the four limbs or torso of the user, that will be represented when attempting to match the posture of an avatar configuring a central character in a VR space image with the physical posture of the user. Moreover, complex mechanisms for combining the respective information to dynamically generate a VR space image also become necessary. This cost of implementing such mechanisms is high, and there is also the complicated task of putting on or installing the necessary equipment for use.

By contrast, the information processing device 10 of the present disclosure is capable of imparting a sense of deep immersion to the user without requiring complex and expensive mechanisms such as those described above.

Moreover, the basic idea of the information processing device 10 of the present disclosure centers on the fact that "misalignment of the pitch angle is the primary cause" of the disconnect between the body of the avatar configuring the central character displayed in the field of vision of the user and the actual physical body of the user.

In cases in which head of the user is looking straight ahead, the two arms and two legs of the user are positioned toward the bottom of the field of vision. Accordingly, unless the user adopts a very specific posture, correcting the pitch angle enables the disconnect between the posture of the avatar in the VR space image and the actual posture of the user to be largely eliminated. This enables a sense of immersion to be imparted to the user.

Moreover, the information processing device 10 of the present disclosure also takes in consideration the flexible cognitive function of the human brain known through the rubber hand illusion and the like. Academic research has clearly demonstrated that when a user is presented with an alternative artificial image expression in their field of vision close to an angle where the user's own body part should be present, the user will feel a strong sense of body ownership with respect to the image expression. Accordingly, by adjusting the pitch angle such that the positions of the four limbs of the user and the like are reproduced at roughly the correct position, even if not at the exact positions, when presenting an alternative image expression, the user can be imparted with a sense of immersion.

Moreover, the information processing device 10 of the present disclosure does not employ a complex posture determination mechanism or dynamic image expression mechanism which might be expected as a natural continuation of the technological approaches adopted hitherto. The information processing device 10 of the present disclosure employs a simple configuration that exploits the flexible cognitive mechanisms of the human brain to the fullest extent in order to impart a substantial psychological effect on the user. Due to such characteristics, the information processing device 10 of the present disclosure enables VR products to be manufactured and provided at low cost.

Moreover, the information processing device 10 of the present disclosure neither requires the user to wear special equipment nor external cameras or the like to be installed, thus enabling preparatory tasks and startup operations by the user to be greatly simplified.

The information processing device 10 of the present disclosure may also be applied to subjects for which dynamic image correction of body expression is not possible, for example pre-filmed actual video footage.

(C) Modified Exemplary Embodiments

Figure 14:
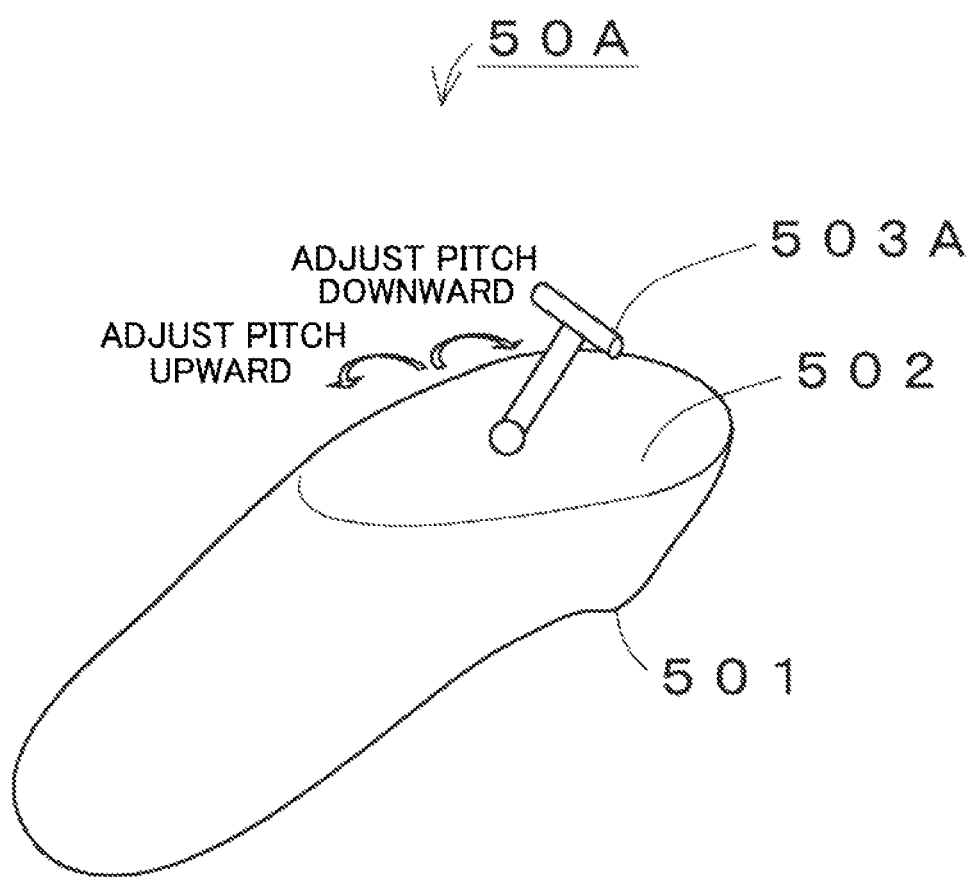
FIG. 14 is a diagram illustrating another example of configuration of the operation device illustrated in FIG. 5.

The exemplary embodiment described above is merely one example, and obviously the present disclosure is not limited to the case described above. For example, although an example has been described in the above exemplary embodiment in which the operation device 50 illustrated in FIG. 5 is employed, operation devices 50A, 50B such as those illustrated in FIG. 14 and FIG. 15 respectively may be employed. FIG. 14 illustrates an example of the operation device 50A, including a lever-type operation portion 503A. Namely, in the example in FIG. 14, the user 90 is able to correct the pitch angle by operating the operation portion 503A with their thumb or the like. Note that in cases in which the lever-type operation portion 503A is operated continuously, the pitch angle may be changed at a predetermined speed (for example 5°/second for a maximum operation) according to the operation amount (tilt) of the lever-type operation portion 503A.

Figure 15:
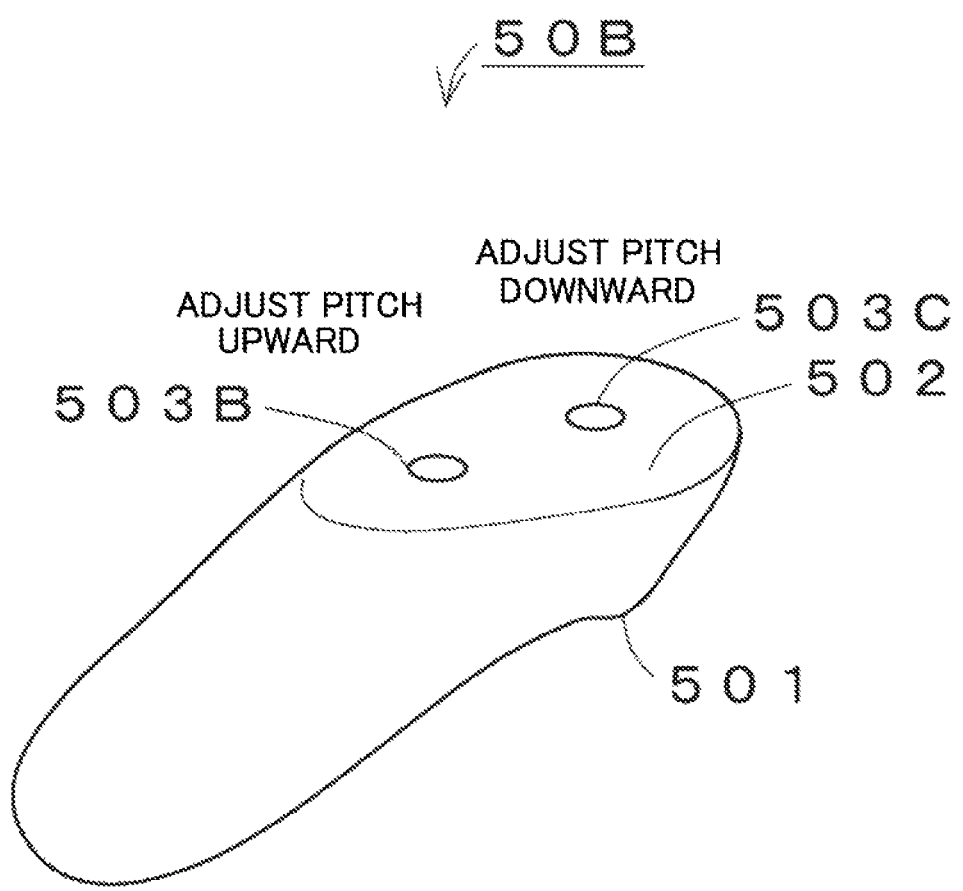
FIG. 15 is a diagram illustrating yet another example of configuration of the operation device illustrated in FIG. 5.

FIG. 15 illustrates an example of configuration of the operation device SOB, including button-type operation portions 503B, 503C. Namely, in the configuration example illustrated in FIG. 15, the pitch can be adjusted to a desired angle by operating the operation portion 503B to move the pitch upward, and by operating the operation portion 503C to move the pitch downward. Note that in cases in which the operation portions 503B. 503C are operated continuously, the pitch angle may be changed at a predetermined speed (for example 5°/second). Note that although the front-rear direction is associated with the pitch angle when performing adjustment using the operation devices illustrated in FIG. 5, FIG. 14, and FIG. 15, the up-down direction of the user may be associated with the pitch angle in order to perform adjustment.

Figure 16:
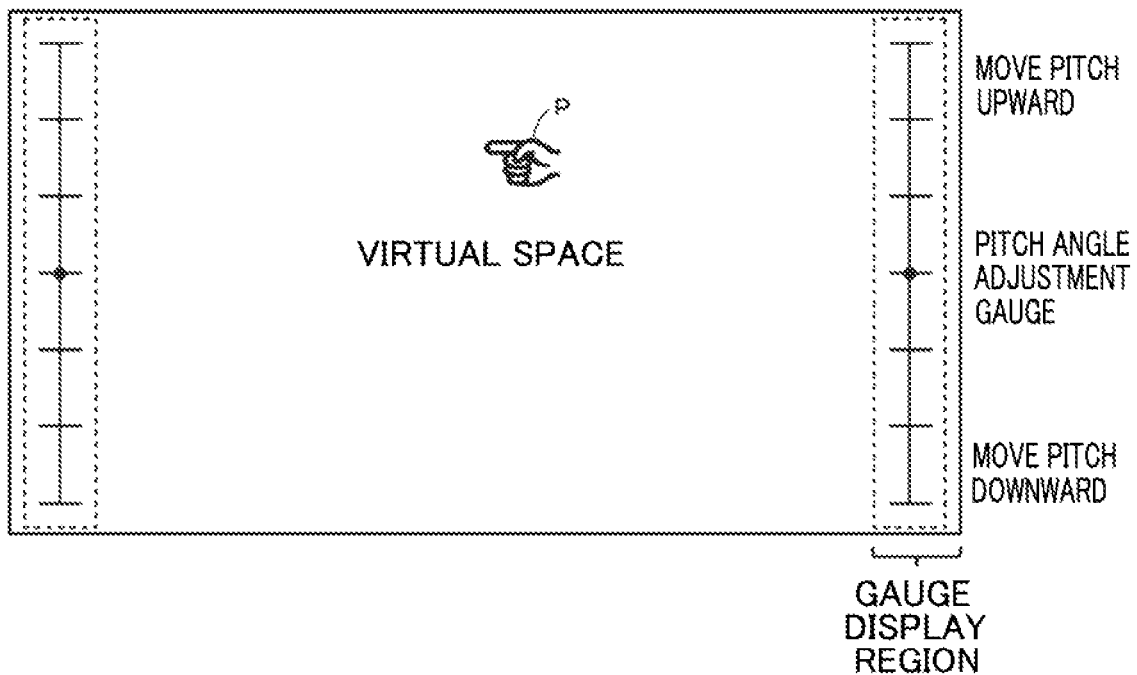
FIG. 16 is a diagram illustrating an example of a display screen in a case in which a pitch angle is adjusted using a pointing device.

Although the operation devices 50, 50A, 50B described above are preferably employed in order to avoid loss of the sense of immersion in VR space, in cases in which such operation devices are not employed, for example with the aim of simplifying the system configuration, as an alternative approach an operation screen may be displayed in the VR space as illustrated in FIG. 16, and input of a pitch angle correction amount accepted through this operation screen.

More specifically, a pointing device provided with the HMD 30 or the information processing device 10 may be used to manipulate or designate objects in VR space in order to operate the operation screen illustrated in FIG. 16.

In the display example illustrated in FIG. 16, by clicking with the pointing device within bands of uniform width at the left and right ends of the screen (referred to hereafter as "gauge display regions"), a pitch angle adjustment gauge is displayed for a given duration (for example 10 seconds). Clicking on a point on the gauge enables a pitch amount (increase/decrease amount) to be specified. Preferably, the upper part of the gauge is used to move the pitch upward and the lower part of the gauge is used to move the pitch downward. A number of straight lines on the gauge may be used to express a pitch amount in a range spanning from +45° (pitch upward) to −45° (pitch downward).

In the case illustrated in FIG. 16, similarly to when employing the operation device 50, the sensitivity (size of the pitch angle correction amount expressed by the gauge) is preferably adjustable through a system option screen. When one point on the gauge has been clicked on, the pitch angle adjustment is reflected, after which the gauge display and click receptivity is sustained for a further duration of the same length (10 seconds in the example given above). This enables the user to repeat the pitch angle adjustment as many times as necessary, thereby enabling fine-tuning to the preferred angle.

Such a pitch angle adjustment gauge is preferably rendered in non-see through colors so as not to be affected by the brightness level of the virtual space. Although gauge display regions are provided at both the left and right ends as standard, it is desirable for the user to be able to choose to feature the pitch angle adjustment gauge at only one out of the left or right sides according to their preferences through option settings. Moreover, even clicks at points outside the range of the pitch angle adjustment gauge may be treated as valid input when performing pitch angle adjustment. This enables an object of interest in the virtual space to be clicked in order to adjust the pitch angle such that this object corresponds to a straight ahead gaze.

Figure 17:
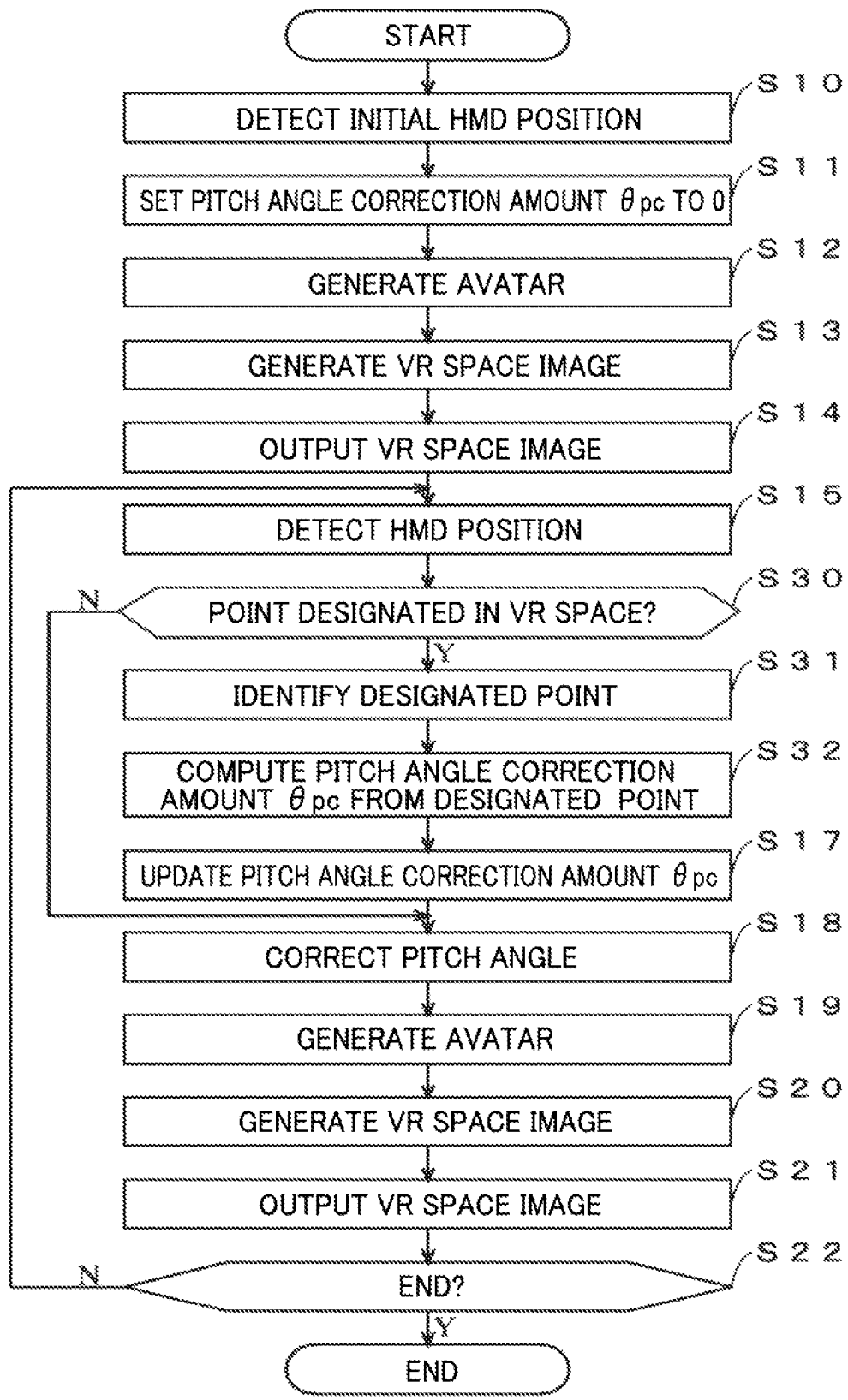
FIG. 17 is a flowchart to explain another example of processing executed in the exemplary embodiment illustrated in FIG. 2.

FIG. 17 is an example of a flowchart for setting of the pitch angle correction amount based on the display screen illustrated in FIG. 16. Note that in FIG. 17, portions corresponding to the flowchart illustrated in FIG. 13 are allocated the same reference numerals, and explanation thereof is omitted. FIG. 17 differs from FIG. 13 in that step S16 has been removed while steps S30 to S32 are additionally provided. Accordingly, explanation follows mainly regarding steps S30 to S32.

At step S30, the pitch angle correction amount setting section 11 determines whether or not a point in the VR space has been designated using a pointing device. Processing proceeds to step S31 in cases in which determination is made that a point has been designated (step S30: YES), and processing proceeds to step S18 in all other cases (step S30: NO). For example, in a case in which the pointing device clicks a gauge display region at the left or right end of the screen in FIG. 16 and then clicks on a point on the gauge, determination is YES and processing proceeds to step S31.

At step S31, the pitch angle correction amount setting section 11 identifies the point that has been clicked on. For example, the pitch angle correction amount setting section 11 identifies the point that has been clicked on using the pointing device for the gauge illustrated in FIG. 16.

At step S32, the pitch angle correction amount setting section 11 computes the pitch angle correction amount $\theta pc$ from the designated point. For example, the pitch angle correction amount setting section 11 computes the pitch angle correction amount $\theta pc$ for the position of a point on the gauge illustrated in FIG. 16 that has been clicked on with the pointing device.

At step S17, the pitch angle correction amount setting section 11 updates an existing pitch angle correction amount $\theta pc$ with the pitch angle correction amount $\theta pc$ computed at step S32.

The above processing enables the pitch angle correction amount used for the display screen illustrated in FIG. 16 to be updated. This modified exemplary embodiment enables the pitch angle correction amount to be set using an existing pointing device without the provision of an additional operation device.

Moreover, although the pitch angle correction amount is input by a manual operation by the user in the exemplary embodiment described above, adjustment may be performed automatically in cases in which the posture of the avatar presented changes based on the intention of the creator etc. Specifically, information indicating the posture of the avatar may be held in the data used to generate the VR space image, and the pitch angle correction amount may be automatically updated based on this information indicating the posture of the avatar.

Figure 18:
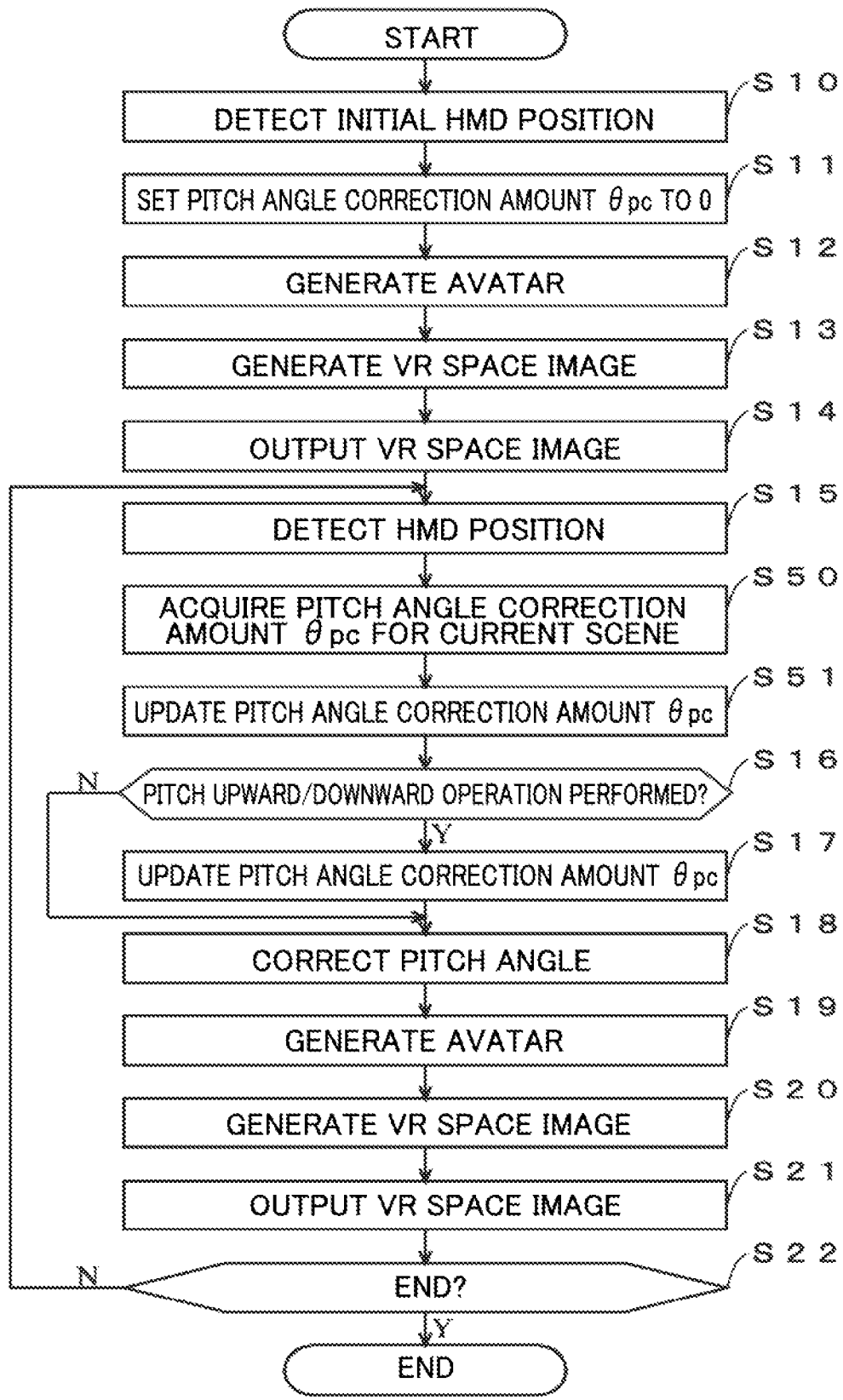
FIG. 18 is a flowchart to explain yet another example of processing executed in the exemplary embodiment illustrated in FIG. 2.

FIG. 18 is a flowchart for implementing such processing. Note that in FIG. 18, portions corresponding to FIG. 13 are allocated the same reference numerals, and explanation thereof is omitted. FIG. 18 differs from FIG. 13 in that the processing of step S50 and step S51 is additionally provided. Other processing is similar to that illustrated in FIG. 13, and so explanation mainly follows regarding the processing of step S50 and step S51. Note that the following processing assumes that pitch angle correction amounts corresponding to the posture of the avatar have been pre-embedded in data employed to generate the VR space image.

At step S50, the pitch angle correction amount setting section 11 acquires the pitch angle correction amount $\theta pc$ corresponding to the VR space image scene currently being presented from, for example, the VR space image generation section 13. For example, the pitch angle correction amount $\theta pc$ that has been pre-embedded in data employed to generate the VR space image according to the posture of the avatar presented in this scene is acquired. The pitch angle correction amount $\theta pc$ changes in cases in which the posture of the avatar changes based on the intention of the creator etc. with a change in the VR space image scene. Accordingly, in cases in which the pitch angle correction amount $\theta pc$ changes, the new pitch angle correction amount $\theta pc$ is, for example, acquired from the VR space image generation section 13 or the avatar generation section 15.

At step S51, the pitch angle correction amount setting section 11 updates the existing pitch angle correction amount $\theta pc$ using the pitch angle correction amount $\theta pc$ acquired at step S50. For example, if the pitch angle correction amount of the immediately preceding scene is denoted $\theta pc1$ and the pitch angle correction amount of a new scene is denoted $\theta pc2$, the pitch angle correction amount $\theta pc2$ is newly set.

At step S16 and step S17, for example the pitch angle correction amount is set in response to operation of the operation device 50 as described previously. Note that at step S17, the pitch angle correction amount $\theta pc$ updated at step S51 may be increased or decreased by a value corresponding to the operation of the operation device 50 in order to set the pitch angle correction amount $\theta pc$.

The above processing enables the pitch angle to be automatically corrected for each change in scene, thereby sparing the user 90 the effort of setting a pitch angle correction amount by manual operation, requiring the user 90 to only fine-tune by operation of the operation device 50.

Specifically, the information processing device 10 corrects the pitch angle automatically with each scene change, and presents a VR space image with the corrected pitch angle on the display. Since the pitch angle correction amounts are set in advance, the pitch angle is corrected automatically. The user 90 is thus spared the effort of setting a pitch angle correction amount by manual operation. The processing of the information processing device 10 thus exhibits the technological advantageous effect of assisting in sparing the user 90 the effort of setting the pitch angle correction amount by manual operation.

Although explanation has been given regarding an example of a case in which the VR space image is rendered by computer graphics in the exemplary embodiment described above, the present disclosure is not limited to such computer graphics, and for example actual filmed images captured using a 360 video camera may be employed. Namely, the present disclosure may be applied to either image based rendering or image based modeling. Note that in cases in which actual filmed images are employed, since the avatar is included in the actual filmed images, the avatar generation section 15 may be omitted from the configuration illustrated in FIG. 2. Obviously 180° video may be employed instead of 360° (all-round) video.

Moreover, in the modified exemplary embodiment illustrated in FIG. 18, the pitch angle correction amounts corresponding to the scenes are embedded in the data to generate the VR space image. However, in cases in which captured images are employed as the presented VR space image instead of computer graphics, instead of embedding pitch angle correction amounts with an image of the central character included in the image, an image analysis processing section may be added to the configuration illustrated in FIG. 3, and analysis processing by the image analysis processing section may be used to identify an appropriate pitch angle correction amount from the image and set the identified pitch angle correction amount.

Moreover, although the processing illustrated in FIG. 13 and so on is executed by the information processing device 10 in the exemplary embodiment described above, the configuration of the information processing device 10 may be incorporated into the HMD 30 such that the processing illustrated in FIG. 13 and so on is executed by the HMD 30.

Although the configuration example illustrated in FIG. 1 includes the network 70 and a server, configuration may be made without including the network 70. Moreover, the information held on the server may be held in the information processing device 10 or the HMD 30.

Although the pitch angle is adjusted in the exemplary embodiment described above, the yaw angle or roll angle may be adjusted as required.

Note that the processing executed by a CPU reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although a program is pre-stored (installed) in storage in the exemplary embodiment described above, there is no limitation thereto. The program may be provided in a format stored on a non-transitory storage medium such as a compact disc read only memory (CD-ROM), digital versatile disc read only memory (DVD-ROM), or universal serial bus (USB) memory. Alternatively, the program may be provided in a format downloadable from an external device over a network.

The respective processing of the exemplary embodiment may be configured by a computer, server, or the like including a generic computation processing device, a storage device, and the like executing a program. Such a program may be stored in the storage device or recorded on a recording medium such as a magnetic disc, an optical disc, or semiconductor memory, or provided over a network. Obviously, other configuration elements do not need to be implemented using a single computer or server, and may be distributed to and implemented by plural computers that are connected together over a network.

Note that the present exemplary embodiment is not limited to the exemplary embodiment described above, and various modifications may be implemented within a range not departing from the spirit of the exemplary embodiment described above.

The disclosure of Japanese Patent Application No. 2019-069568, filed on Mar. 31, 2019, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An information processing device configured to present a virtual space at a display mounted on a head of a user, the information processing device comprising:
   a memory; and
   a processor coupled to the memory, the processor being configured to:
   input detection information from a sensor that detects movement of the head of the user;
   generate the virtual space including a body image representing at least a part of a body of the user in response to the detection information;
   calculate, from the movement of the head of the user, a first itch direction angle;
   input correction information from a device operated to perform correction of an angle in a pitch direction of the head of the user;
   calculate a second pitch direction angle employed when presenting the virtual space including the body image at the display, wherein the second pitch direction angle is calculated by referring to both the first pitch direction angle and the correction information; and
   present the virtual space including the body image at the display with the calculated second pitch direction angle.

2. The information processing device of claim 1, wherein the processor is further configured to:
   store the correction information in the memory, and
   calculate the second pitch direction angle in the virtual space based on the correction information stored in the memory.

3. The information processing device of claim 2, wherein, in cases in which a pitch direction correction angle is newly designated, the processor is configured to take an immediately preceding value of the correction information stored in the memory as an initial value in order to specify a correction value of the second pitch direction angle in the virtual space.

4. The information processing device of claim 1, wherein:
   the device includes an operation portion enabling an operation relating to a direction corresponding to a front-rear direction or an up-down direction of the user; and
   the processor is configured to refer to an operation amount in the direction corresponding to the front-rear direction or the up-down direction of the operation portion in order to calculate the second pitch direction angle employed when presenting the virtual space including the body image at the display.

5. The information processing device of claim 1, wherein:
   the device enables designation of at least one point in the virtual space; and
   the processor is configured to refer to a position designated using the device in order to calculate the second pitch direction angle employed when presenting the virtual space including the body image at the display.

6. The information processing device of claim 1, wherein:
   the processor is further configured to acquire a third pitch direction angle of the body image in the virtual space; and
   the processor is configured to refer to the third pitch direction angle of the body image in order to calculate the second pitch direction angle employed when presenting the virtual space including the body image at the display.

7. The information processing device of claim 1, wherein the processor is configured to display a gauge representing a pitch direction angle correction amount in a portion of the virtual space based on the correction information.

8. An information processing method for presenting a virtual space at a display mounted on a head of a user, in which a processor executes processing comprising:
   inputting detection information from a sensor that detects movement of the head of the user;
   generating the virtual space including a body image representing at least a part of a body of the user in response to the detection information;
   calculating, from the movement of the head of the user, a first pitch direction angle;
   inputting correction information from a device operated to perform correction of an angle in a pitch direction of the head of the user;
   calculating a second pitch direction angle employed when presenting the virtual space including the body image at the display, wherein the second pitch direction angle is calculated by referring to both the first pitch direction angle and the correction information; and
   presenting the virtual space including the body image at the display with the calculated second pitch direction angle.

9. A non-transitory computer readable storage medium storing an information processing program executable by a processor to perform processing, the processing comprising:
   inputting detection information from a sensor that detects movement of a head of a user;
   generating a virtual space including a body image representing at least a part of a body of the user in response to the detection information;
   calculating, from the movement of the head of the user, a first pitch direction angle;
   inputting correction information from a device operated to perform correction of an angle in a pitch direction of the head of the user;
   calculating a second pitch direction angle employed when presenting the virtual space including the body image at a display, wherein the second pitch direction angle is calculated by referring to both the first pitch direction angle and the correction information; and
   presenting the virtual space including the body image at the display with the calculated second pitch direction angle.

10. An information processing device configured to present a virtual space at a display mounted on a head of a user, the information processing device comprising:
    a memory; and
    a processor coupled to the memory, the processor being configured to:
      input detection information from a sensor that detects movement of the head of the user;
      generate the virtual space including a body image representing at least a part of a body of the user in response to the detection information;
      present the virtual space including the body image at the display;
      input correction information from a device operated to perform correction of an angle in a pitch direction of the head of the user while the virtual space including the body image is being presented at the display; and
      correct a pitch direction angle of the virtual space including the body image employed when presenting the virtual space at the display based on the correction information so as to suppress divergence between a display position of the body image and a position of the part of the body of the user, wherein the processor is configured to present the virtual space including the body image at the display with the pitch direction angle corrected.

11. An information processing method for presenting a virtual space at a display mounted on a head of a user, in which a processor executes processing comprising:
    inputting detection information from a sensor that detects movement of the head of the user;
    generating the virtual space including a body image representing at least a part of a body of the user in response to the detection information;
    presenting the virtual space including the body image at the display;
    inputting correction information from a device operated to perform correction of an angle in a pitch direction of the head of the user while the virtual space including the body image is being presented at the display; and
    correcting a pitch direction angle of the virtual space including the body image employed when presenting the virtual space at the display based on the correction information so as to suppress divergence between a display position of the body image and a position of the part of the body of the user, wherein the virtual space including the body image is presented at the display with the pitch direction angle corrected.

12. A non-transitory computer readable storage medium storing an information processing program executable by a processor to perform processing, the processing comprising:
    inputting detection information from a sensor that detects movement of a head of a user;
    generating a virtual space including a body image representing at least a part of a body of the user in response to the detection information;
    presenting the virtual space including the body image at a display;
    inputting correction information from a device operated to perform correction of an angle in a pitch direction of the head of the user while the virtual space including the body image is being presented at the display;
    correcting a pitch direction angle of the virtual space including the body image employed when presenting the virtual space at the display based on the correction information so as to suppress divergence between a display position of the body image and a position of the part of the body of the user; and
    presenting the virtual space including the body image at the display with the pitch direction angle corrected.

13. An information processing device configured to present a virtual space at a display mounted on a head of a user, the information processing device comprising:
    a memory; and
    a processor coupled to the memory, the processor being configured to:
      input detection information from a sensor that detects movement of the head of the user;
      generate the virtual space including a body image representing at least a part of a body of the user in response to the detection information;
      present the virtual space including the body image at the display; and
      acquire correction information for correcting an angle in a pitch direction of the head of the user while presenting the virtual space including the body image at the display, and based on the correction information, correct a pitch direction angle of the virtual space including the body image employed when presenting the virtual space at the display so as to suppress divergence between a display position of the body image and a position of the part of the body of the user, wherein the processor is configured to present the virtual space including the body image at the display with the pitch direction angle corrected.

14. An information processing method for presenting a virtual space at a display mounted on a head of a user, in which a processor executes processing comprising:
inputting detection information from a sensor that detects movement of the head of the user;
generating the virtual space including a body image representing at least a part of a body of the user in response to the detection information;
presenting the virtual space including the body image at the display; and
acquiring correction information for correcting an angle in a pitch direction of the head of the user while the virtual space including the body image is presented at the display, and based on the correction information, correcting a pitch direction angle of the virtual space including the body image employed when presenting the virtual space at the display so as to suppress divergence between a display position of the body image and a position of the part of the body of the user, wherein the virtual space including the body image is presented at the display with the corrected pitch direction angle.

15. A non-transitory computer readable storage medium storing an information processing program executable by a processor to perform processing, the processing comprising:
inputting detection information from a sensor that detects movement of a head of a user;
generating a virtual space including a body image representing at least a part of a body of the user in response to the detection information;
presenting the virtual space including the body image at a display; and
acquiring correction information for correcting an angle in a pitch direction of the head of the user while presenting the virtual space including the body image at the display, and based on the correction information, correcting a pitch direction angle of the virtual space including the body image employed when presenting the virtual space at the display so as to suppress divergence between a display position of the body image and a position of the part of the body of the user, wherein the processor is configured to present the virtual space including the body image at the display with the pitch direction angle corrected.

* * * * *